(12) United States Patent
Hans

(10) Patent No.: US 7,196,446 B2
(45) Date of Patent: Mar. 27, 2007

(54) ROTOR FOR AN ELECTRIC MOTOR

(75) Inventor: Helmut Hans, Sankt Georgen (DE)

(73) Assignee: Minebea Co., Ltd., Nagano-Ken (JP)

(*) Notice: Subject to any disclaimer, the term of this patent is extended or adjusted under 35 U.S.C. 154(b) by 181 days.

(21) Appl. No.: 10/830,474

(22) Filed: Apr. 23, 2004

(65) Prior Publication Data

US 2005/0001503 A1   Jan. 6, 2005

(30) Foreign Application Priority Data

Apr. 24, 2003  (DE) ............................ 103 18 624
Sep. 30, 2003  (DE) ............................ 103 45 417

(51) Int. Cl.
H02K 21/12       (2006.01)
H02K 1/27        (2006.01)

(52) U.S. Cl. ................... 310/156.53; 310/216

(58) Field of Classification Search ........ 310/156.53, 310/156.56, 156.57, 156.74, 156.76, 156.84, 310/216, 156.07
See application file for complete search history.

(56) References Cited

U.S. PATENT DOCUMENTS

| | | | |
|---|---|---|---|
| 4,127,786 A * | 11/1978 | Volkrodt ............... | 310/156.84 |
| 4,327,302 A | 4/1982 | Hershberger | |
| 4,339,874 A * | 7/1982 | Mc'Carty et al. ...... | 29/598 |
| 4,922,152 A | 5/1990 | Gleghorn et al. | |
| 4,924,130 A | 5/1990 | Fratta | |
| 5,929,547 A * | 7/1999 | Kim ..................... | 310/156.53 |
| 6,031,311 A | 2/2000 | Lee | |
| 6,147,428 A * | 11/2000 | Takezawa et al. ..... | 310/156.57 |
| 6,177,745 B1 | 1/2001 | Narita et al. | |
| 6,800,977 B1 * | 10/2004 | Ostovic ................ | 310/156.38 |
| 6,906,444 B1 * | 6/2005 | Hattori et al. ......... | 310/156.53 |
| 2002/0067096 A1 | 6/2001 | Yamamoto et al. | |
| 2001/0017499 A1 * | 8/2001 | Keneko et al. ........ | 310/156.38 |

FOREIGN PATENT DOCUMENTS

| | | |
|---|---|---|
| DE | 2062486 | 7/1972 |
| DE | 222745 | 5/1985 |
| DE | 10100718 | 7/2002 |
| EP | 0641059 | 3/1995 |
| EP | 0691727 | 1/1997 |
| EP | 0803962 | 10/1997 |
| EP | 0872944 | 10/1998 |
| EP | 0955714 | 11/1999 |
| EP | 1128522 | 8/2001 |
| EP | 1223658 | 7/2002 |
| EP | 1309066 | 5/2003 |
| FR | 2802726 | 6/2001 |
| GB | 1177247 | 1/1970 |
| JP | 54-148214 * | 5/1978 ............ 310/156.07 |

(Continued)

OTHER PUBLICATIONS

"Design of Brushless Permanent-Magnet Motors," J.R. Hendershot Jr. and TJE Miller, Magna Physics Publishing and Clarendon Press, Oxford, 1994.

(Continued)

Primary Examiner—Tran Nguyen
(74) Attorney, Agent, or Firm—Duane Morris LLP

(57) ABSTRACT

The invention relates to a rotor for an electric motor comprising an essentially cylindrical rotor core having a central aperture, and comprising permanent magnets which are embedded in the rotor core and extend essentially like spokes through the rotor core, the radially inner ends of selected adjacent permanent magnets being magnetically coupled by at least one auxiliary magnet.

3 Claims, 21 Drawing Sheets

| | FOREIGN PATENT DOCUMENTS | | |
|---|---|---|---|
| JP | 54148214 | 11/1979 | |
| JP | 63-140644 | * 12/1986 | ............ 310/156.56 |
| JP | 08275419 | 10/1996 | |
| JP | 2001339885 | 12/2001 | |
| JP | 09009537 | 7/2002 | |
| JP | 2003088019 | 3/2003 | |
| JP | 2003116235 | 4/2003 | |
| JP | 2003264947 | 9/2003 | |
| WO | WO 00/57537 | 8/2000 | |

OTHER PUBLICATIONS

European Search Report for EP04006412.3.

* cited by examiner

ROTOR FOR AN ELECTRIC MOTOR

This application claims priority to the filing date of German Patent Application No. 103 18 624.7 filed Apr. 24, 2003 and German Patent Application No. 103 45 417.9 filed Sep. 30, 2003, the specification of both applications being incorporated herein in their entirety.

FIELD OF THE INVENTION

The invention relates to a rotor for an electric motor comprising an essentially cylindrical rotor core having a central aperture, and comprising permanent magnets which are embedded in the rotor core and extend essentially like spokes through the rotor core.

BACKGROUND OF THE INVENTION

More generally, the invention relates to the field of electric motors having permanent magnets such as brushless, electronically commutated DC motors and other permanent magnet motors, and in particular those configured as inner rotor motors. In general, inner rotor motors consist of a rotor arrangement which is mounted onto the motor shaft and includes one or more permanent magnets, as well as a stator arrangement, such as a stator core, which is built up of metal laminations that carry windings. The rotor arrangement is coaxially inserted into the stator arrangement. For outer rotor motors, the rotor arrangement encloses the stator.

FIG. 11 shows the basic construction of an electric motor having a housing 114 in which a stator arrangement 118, a rotor arrangement 116 and bearings 126, 128 are accommodated to rotatably support the rotor arrangement. The stator arrangement 118 includes stacked metal laminations 155 and windings 160 and encloses an inner space into which the rotor arrangement 116 can be inserted. The rotor arrangement 116 includes the shaft 110, a back iron yoke 112 and permanent magnets 122. The bearings 126, 128 supporting the rotor arrangement can be integrated into a flange 124 in the motor housing 114.

FIG. 11 serves to explain the basic construction of an electric motor, with the rotor of the invention having an essentially cylindrical rotor core in which the permanent magnets are embedded.

According to the prior art, rotors with embedded magnets are generally known. A rotor configuration having a multi-polar design resembling a spoked wheel with radially extending embedded magnets is revealed, for example, in "Design of Brushless Permanent-Magnet Motors", J. R. Hendershot Jr. and T J E Miller, Magna Physics Publishing and Clarendon Press, Oxford, 1994. As shown in this publication, it is known to manufacture a rotor with embedded radially extending magnets that are protected by means of a ring or a tube surrounding the rotor. The rotor in which the magnets are embedded is used as a back yoke.

A conventional form of rotors with embedded magnets is also revealed in EP 0 691 727 A1. This publication shows a number of permanent magnets which are inserted into slots formed in the rotor allowing the permanent magnets to be inserted into the rotor from the outside. At their radially inner ends, the permanent magnets are enclosed by the material of the rotor core.

Rotors with embedded permanent magnets have the basic advantage that the magnets can be fully encapsulated so that the rotor can also come into contact with aggressive media without the magnet material needing special surface protection to prevent corrosion etc. However, the described rotor design has the disadvantage that stray flux is generated by the rotor core in the vicinity of the shaft.

To prevent such stray flux from arising, it has been suggested in the prior art to place a sleeve made of magnetically non-conductive or low-conductive material onto the shaft onto which the flux guide elements of the rotor core are then fixed, between which the permanent magnets in turn are embedded. Such a design is revealed, for example, in EP 0641 059 A1; EP 0 803 962 A1; and DE 101 00 718 A1. Although this construction represents a great improvement on the prior art as described above in terms of the magnetic circuit and the distribution of magnetic flux density in the rotor, it is costly to manufacture and, due to the many individual parts, problems in the mechanical construction, such as an addition of tolerances, could arise.

EP 0803 962 A1 additionally shows that the slots to accommodate the permanent magnets have a bridge on their outer periphery to fully protect the permanent magnets from the outside.

WO 00/57537 describes a multi-polar permanent magnet rotor for an electric motor having embedded magnets which are disposed in such a way that a concentration of flux is produced. The permanent magnets are formed as flat cubes which are disposed like spokes radially to the rotor axis in recesses that are arranged between the flux guide elements which are fixed to the rotor. In assembling the magnets and the flux guide elements, the permanent magnets are formed as adjacent half-elements representing one pole respectively, and both the permanent magnets and the flux guide elements are attached to the shaft via a sleeve.

U.S. Pat. No. 4,327,302 describes a rotor construction having embedded permanent magnets for use in an electric motor. The rotor is made of stacked punched-out metal laminations which have V-shaped openings, with a permanent magnet being embedded in each of the two legs of each slot so that the permanent magnets extend essentially like spokes through the rotor core. At the apex of the opening, two adjacent permanent magnets are bridged by a free space which is filled with air or a non-magnetic material. The purpose of the above arrangement is to provide a simple, compact construction for an electric motor with high output power.

EP 1 309 066 describes a rotor for an electric motor which is constructed in essentially the same way as described above in reference to U.S. Pat. No. 4,327,302. With this construction, EP 1 309 066 aims to keep stray flux via the shaft as low as possible while providing a simple design for the lamination stack. Another method of constructing a rotor having embedded magnets is shown in EP 0 872 944 A1. The magnets are arranged in a radial direction, or parallel to a radial direction, to the rotor. In EP 0 872 944, the permanent magnets are disposed in a so-called double-spoke configuration. Each of these "double magnets" consists of a pair of permanent magnets whose direction of magnetization is substantially the same. They can be arranged parallel to each other as in the cited publication or inclined at an angle to each other. This arrangement goes to improve the running performance of the electric motor and, in particular, to reduce cogging torque and torque ripple.

Other published patents in respect of rotors with embedded magnets include GB 1,177,247; EP 0 955 714 A2; and U.S. 2002/0067096 A1.

The rotor presented in the invention preferably finds application in a brushless DC motor or another permanent magnet synchronous motor. Such motors can be used in a great variety of applications, including spindle motors for disc drives, motor-assisted systems in motor vehicles such as steering and braking systems, electric tools and many other applications.

The radial arrangement of the permanent magnets embedded in the rotor core gives rise to the problem of stray flux in the region of the shaft onto which the rotor is mounted. The shaft is usually made from steel and acts as an extra back yoke for the magnetic flux through the rotor core. This gives rise to considerable magnetic stray. This problem can be countered by fitting a sleeve made from a magnetically non-conductive or low-conductive material to the shaft to which the flux guide elements of the rotor core are fixed, between which in turn the permanent magnets are embedded. This construction method is relatively costly and requires extra individual parts.

In EP 1 309 066 cited above, to reduce stray flux via the shaft, it is suggested to construct the rotor as a lamination stack in such a way that the annular lamination has U-shaped punched out sections distributed evenly in a circle. The legs of the punched out sections extend radially outwards and a permanent magnet is inserted into each leg of the U-shaped punch-out. An air gap is formed between the radially inner ends of the permanent magnets within the punchouts which reduces stray flux to the shaft. Tests made by the applicant found that a non-negligible amount of stray flux still arises in this construction.

The object of the present invention is to submit a rotor for an electric motor which has embedded magnets and is simple to manufacture but nonetheless prevents the above problem of stray flux being generated in the region of the shaft.

SUMMARY OF THE INVENTION

This object has been achieved through a rotor having the characteristics described in claim 1.

The rotor presented in the invention has an essentially cylindrical rotor core with a central aperture. Permanent magnets are embedded in the rotor core and extend essentially like spokes through the rotor core. According to the invention, selected adjacent permanent magnets are coupled with at least one auxiliary magnet at their radially inner ends. As described above, for rotor cores of the prior art the problem arises that sometimes considerable stray flux is generated in the region of the shaft at the radially inner ends of the permanent magnets. The basic idea behind the invention is to divert the magnetic flux lines there where the risk of forming undesirable stray fields is the greatest and to direct them in the desired direction, i.e. radially outwards towards the stator. The auxiliary magnets are preferably magnetized and disposed in such a way that they concentrate the magnetic field lines in the space between the adjacent permanent magnets, through which in turn the magnetic flux between the rotor and the stator, and thus the effectiveness of the electric motor, is increased. By these means, magnetic stray can be reduced considerably. Moreover, the magnetic field lines are guided more intensively to the outer region of the rotor which increases the effectiveness of the electric motor. Depending on the construction of the rotor, one or more auxiliary magnets can be provided to couple a pair of adjacent permanent magnets.

In a preferred embodiment of the invention, the radially inner ends of two adjacent permanent magnets are bridged by a recess in the rotor core, the auxiliary magnet to magnetically couple these permanent magnets being disposed in the recess. The recess can basically be filled with air or another magnetically low-conductive material, with it being possible for the auxiliary magnets to fill the recess partially or in full and replace the air or the magnetically low-conductive material to a corresponding extent. The effect of the auxiliary magnets is that the magnetic field lines become concentrated in the space between the respective adjacent permanent magnets.

In another embodiment, an auxiliary magnet can also completely bridge the radially inner ends of two respective adjacent permanent magnets. In a special embodiment, to achieve this the auxiliary magnet and the associated adjacent permanent magnets are integrally formed as one piece. For this purpose, U-shaped magnets are preferably used. This enables a particularly easy construction.

The recess can be enclosed by a surrounding bridge at the central aperture of the rotor core, the radially inner ends of the associated adjacent permanent magnets and radial side bridges in such a way that they are either open or closed towards the center of the rotor core. This is achieved by the surrounding bridge being formed either continuously or with interruptions. The embodiment having a continuous inner bridge has the advantage that the rotor is stable at the inner ring where it is fixed to the shaft and the permanent magnets are fully embedded and protected.

In another embodiment of the invention, the adjacent permanent magnets are bridged by a recess in the rotor core, as described above, the auxiliary magnet(s), however, not being disposed in the recess but rather integrated in the surrounding inner bridge at the central aperture of the rotor core. For this purpose in particular, the surrounding bridge has interruptions into which the auxiliary magnets can be inserted. In this way, an entirely closed inner ring of the rotor is formed.

It is particularly expedient when the permanent magnets disposed like spokes in the rotor core are combined in pairs and each pair of adjacent permanent magnets is magnetically coupled by one (or several) auxiliary magnets. The permanent magnets in a pair can be magnetized in the same direction or in the opposite direction.

In a beneficial embodiment of the invention, the permanent magnets are arranged in the rotor core like double spokes in pairs of permanent magnets magnetized in the same direction, each adjacent pair being magnetically coupled at the radially inner ends of two adjacent permanent magnets by an auxiliary magnet.

The auxiliary magnet(s) is/are preferably magnetized in a radial direction in order to concentrate the magnetic field lines in the space between the selected adjacent permanent magnets. Here, adjacent auxiliary magnets can be magnetized in the same direction or in the opposite direction as desired.

In one embodiment of the invention provision is made for the permanent magnets to be enclosed by the rotor core at least at their radially inner ends or at their radially outer ends to form a single-piece, integral rotor core. If the inner ring of the flux guide elements is interrupted towards the shaft, the flux guide elements still remain integral provided that the permanent magnets are enclosed at the outer side of the rotor core. Cutouts or punch-outs for the permanent magnets, however, can also be provided in the rotor core which are open radially towards the outside, i.e. the permanent magnets are not fully enclosed by the flux guide elements at the outer side of the rotor core. In this case, the flux guide elements are no longer integrally connected to each other. This embodiment has the advantage, however, that the magnetic flux is concentrated even more intensively at the outer side of the rotor which goes to increase the effectiveness and maximum performance of the motor even further.

In another embodiment of the invention, the permanent magnets are fully enclosed by the rotor core at their radially outer ends. This produces a rotor with fully embedded rotor magnets allowing the rotor to come into contact with aggressive media as well without causing problems. A large variety of magnetic materials can be used and, in particular, those materials that would require extra surface protection if the magnets were exposed.

The rotor core consists of a ferromagnetic material, preferably of sheet metal laminations which are stacked to prevent eddy currents. As an alternative, ferrite materials can be used. The rotor core can be constructed in such a way that it has slots into which the permanent magnets can be inserted from either side. The rotor core is then sealed from both sides so that the magnets are hermetically sealed and do not require a surface coating. As magnetic materials, neodymium-iron-boron (NbFeB) or samarium-cobalt (SmCo) magnets can be used, for example. To prevent corrosion of these materials they would normally have to be coated. By embedding them fully into the rotor core, however, this is no longer necessary. Moreover, fully embedding the permanent magnets into the rotor core provides the permanent magnets with extra mechanical protection.

The invention can also be applied to an outer rotor motor. In this configuration, the recesses which bridge two adjacent permanent magnets are provided in the vicinity of the outer periphery of the rotor core.

SHORT DESCRIPTION OF THE DRAWINGS

The invention is described in more detail below on the basis of preferred embodiments with reference to the drawings. The figures show:

FIG. 1 a schematic sectional view through a rotor which is ideal in respect of the magnetic circuit;

FIG. 2b shows a similar view as in FIG. 2a with flux lines being marked in;

FIG. 3b shows a similar view as in FIG. 3a with flux lines being marked in;

FIG. 3c shows a schematic sectional view through a rotor which is a modification on FIG. 3a;

FIG. 4b shows a similar view as in FIG. 4a with flux lines being marked in;

FIG. 5b shows a similar view as in FIG. 5a with flux lines being marked in;

FIG. 6b shows a similar view as in FIG. 6a with flux lines being marked in;

FIG. 7b shows a similar view as in FIG. 7a with flux lines being marked in;

FIG. 9c shows a similar view as in FIG. 9b with flux lines being marked in;

FIG. 10b shows a similar view as in FIG. 10a with flux lines being marked in;

DETAILED DESCRIPTION OF PREFERRED EMBODIMENTS

Figure 1:
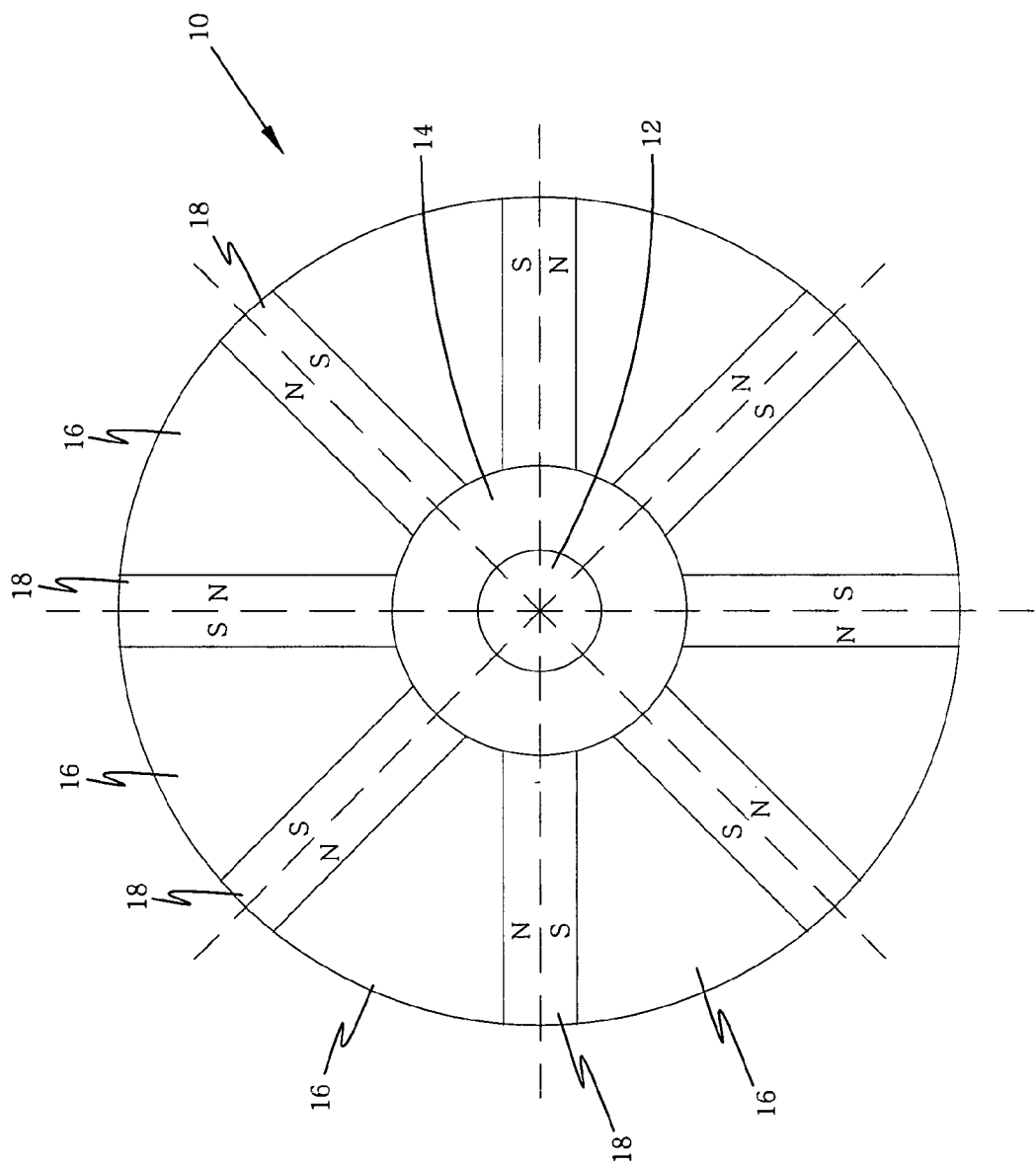

FIG. 1 shows a schematic sectional view through a rotor which is ideally constructed in respect of the magnetic circuit. The rotor 10 is fitted onto a shaft 12 which is usually made of steel. For this purpose, a sleeve 14 is pressed or bonded onto the shaft 12 and flux guide elements 16 are fixed to the sleeve 14, between which permanent magnets 18 are embedded. The sleeve 14 has the function of preventing magnetic stray flux between the flux guide elements 16 and the shaft 12. For this purpose, it is made of a magnetically non-conductive or low-conductive material. With the aid of the sleeve 14, it is possible to ensure that practically no magnetic losses are incurred in the region of the shaft 12. This construction of the rotor 10 as illustrated in FIG. 1 is thus ideal in terms of the magnetic circuit. It is disadvantageous, however, in that it requires many individual parts, making the mechanical construction both complicated and costly.

Figure 2A:
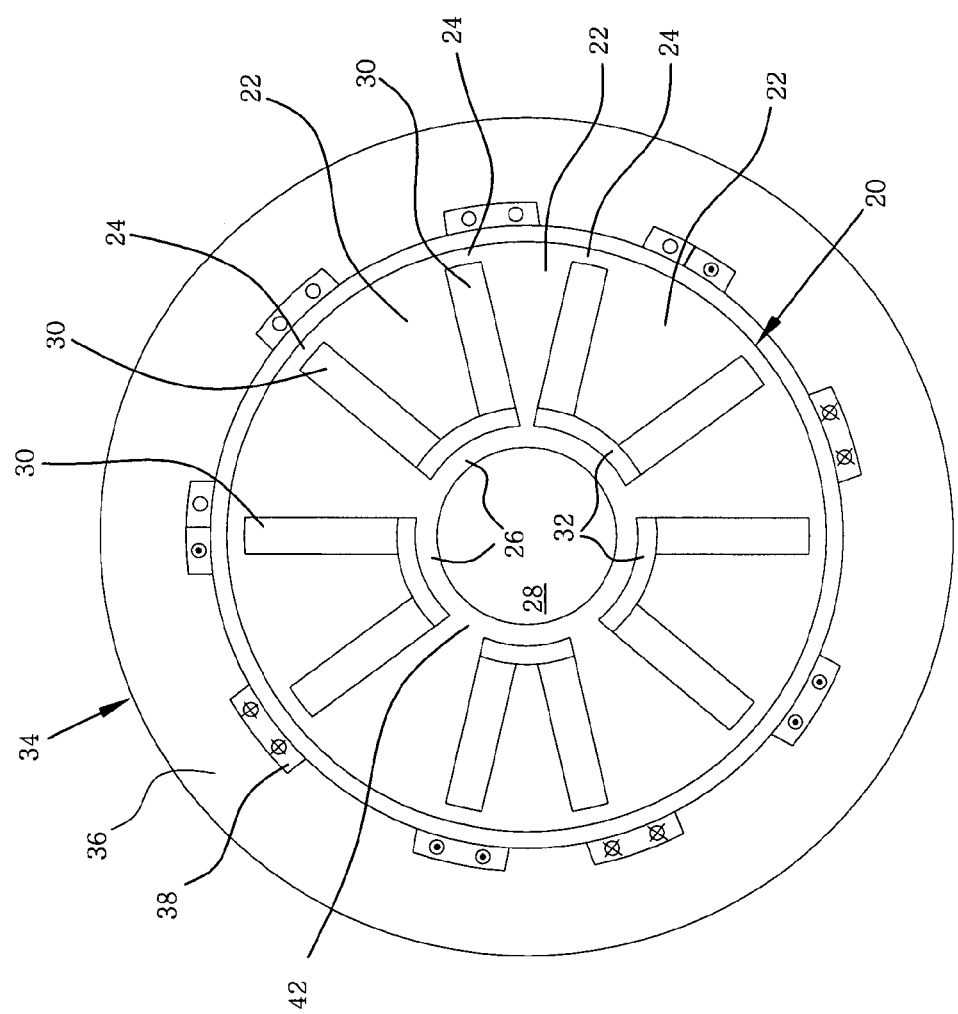
FIG. 2a shows a schematic sectional view through a rotor which represents a starting point for the invention and is described in the unpublished patent application DE 103 18 624.

FIG. 2a shows a schematic sectional view through a rotor which represents a starting point for the invention. The rotor 20 includes flux guide elements 22 which are joined together via outer and inner bridges 24, 26 at the outer periphery or at a central aperture 28 of the rotor 20 respectively. In the illustrated embodiment, the inner bridges 26 form a closed ring and thus enclose the central aperture 28. Permanent magnets 30 are embedded between the flux guide elements 22 and extend like spokes in a radial direction through the rotor 20.

The outer bridges 24 have the function of fully embedding and protecting the permanent magnets 30 in the rotor 20 from the outside so that the permanent magnets 30 cannot come into contact with the medium surrounding the rotor 20. The inner bridges 26 have a similar function. The inner bridges 26 ensure that the rotor 20 is fixedly connected to the shaft 12. The bridges 24, 26 connect the flux guide elements 22 so that the rotor 20 forms a single integral body.

In the embodiment illustrated in FIG. 2a, the inner bridges 26 form a closed ring enabling the rotor 20 to be directly fitted, e.g. pressed or bonded, onto the shaft (not illustrated) without the need to interpose a sleeve.

The inner bridges 26 are connected to the flux guide elements 22 via short radial bridges 42 and each enclose a recess 32. In the embodiment illustrated in FIG. 2, each recess 32 bridges two adjacent permanent magnets 30, with the inner bridges 26 in this embodiment connecting like poles of the permanent magnets 30. In the embodiment illustrated in FIG. 2, the bridges 26 connect the S poles. It is clear that the inner bridges could also connect only the N poles. This produces a rotor 20 design in which the bridges 26 bridge the radial inner ends of two permanent magnets 30 and thus enclose the recess 32 which can be filled with air or another magnetically non-conductive or low-conductive medium.

Due to the illustrated embodiment of the rotor 20 and in particular due to the specific design and arrangement of the recesses 32, stray flux in the interior of the rotor 20, that is to say near the inner bridges 26 and the central aperture 28, can to some extent be prevented. This results in a lower magnetic loss than in the case of conventional rotors with embedded magnets which are constructed without the sleeve 14 shown in FIG. 1.

The flux guide elements 22 are made of ferromagnetic material and are preferably formed from sheet metal laminations which are stacked to prevent eddy currents. As an alternative, they can be made from ferrite material. The flux guide elements 22 of the rotor 20 can be built as an integral component into which the magnets 30 are inserted from either side. The rotor 20 is then sealed so that the magnets are hermetically sealed and do not require a surface coating.

The rotor 20 is enclosed by a stator 34 which includes a stator core 36 and stator windings 38. The stator core 36 can again consist of sheet metal laminations which are stacked as generally known in the prior art.

All permanently magnetic materials can be used as magnet materials. Examples include neodymium-iron-boron (NbFeB) and samarium-cobalt (SmCo) as well as plastic-bonded magnetic materials.

Figure 2B:
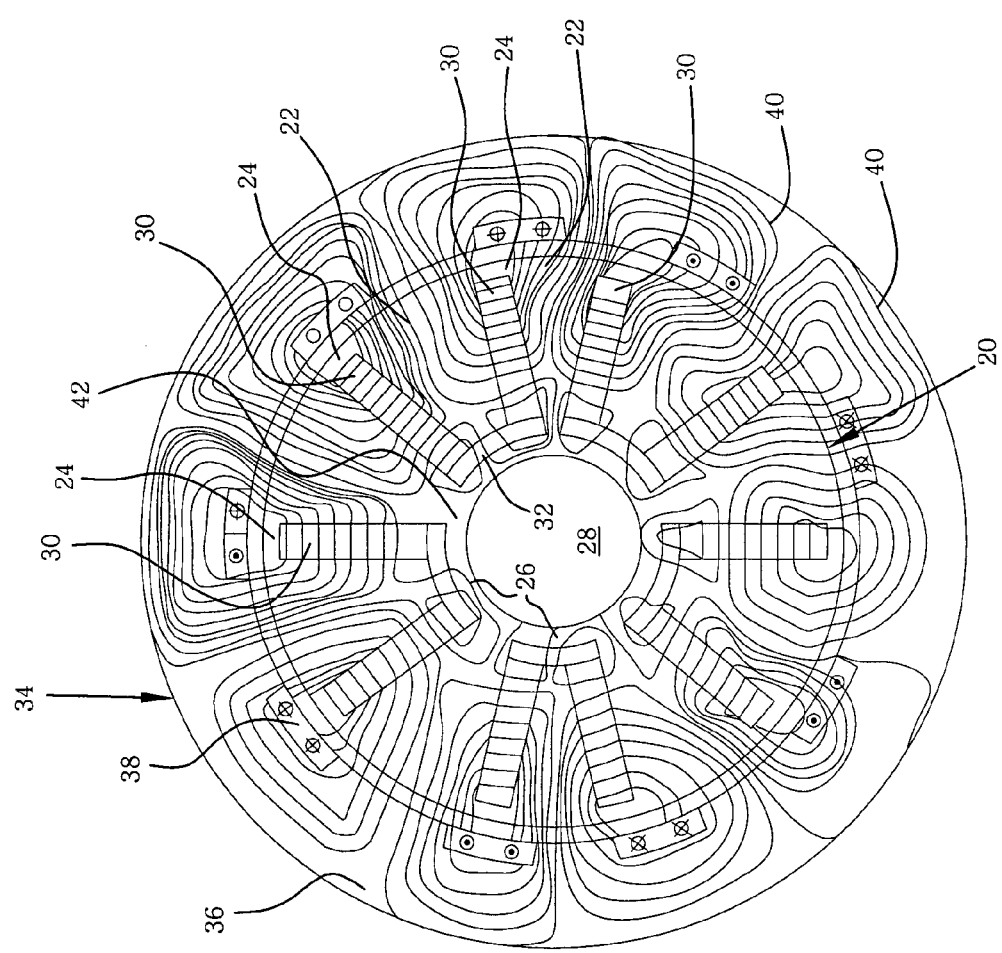

FIG. 2b shows a schematic sectional view through the rotor illustrated in FIG. 2a. In FIG. 2b, flux lines 40 have been marked in to explain the effect of the recesses 32. Like components appearing in FIG. 2a are indicated by the same reference numbers and are not described in detail again.

In FIG. 2b, magnetic flux lines 40 are marked in, with the strength of the magnetic field being greater where the flux lines are more densely spaced so that it can be seen from the figure that the magnetic flux is very low in the region of the recesses 32. This means that very little stray flux between the rotor 20 and the shaft, on which it is placed, is incurred during operation without the need to provide a special sleeve between the rotor and the shaft. In this way, losses can be kept low.

Figure 3A:
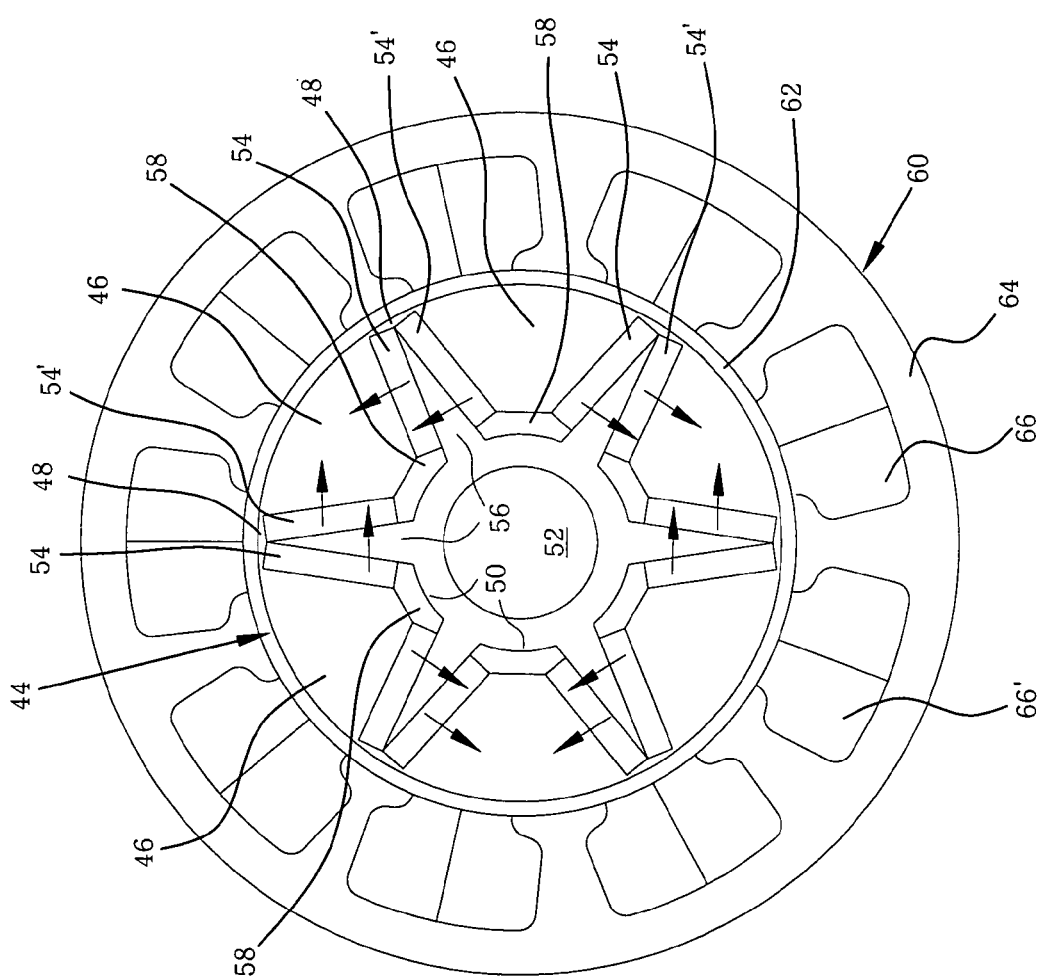
FIG. 3a shows a schematic sectional view through a rotor which is a modification on FIG. 2a and is described in the unpublished patent application DE 103 18 524.

FIG. 3a shows a schematic sectional view through another embodiment of the rotor on which the invention is based. The rotor 44 includes flux guide elements 46 which are connected via outer and inner bridges 48 or 50 at the outer periphery or at a central aperture 52 in the rotor 44 respectively in order to form an integral body. In the illustrated embodiment, the inner bridges 50 form a closed ring and enclose the central aperture 52. Permanent magnets 54, 54' are embedded between the flux guide elements 46 and extend through the rotor 44 in an essentially radial direction like double spokes. Two directly adjacent permanent magnets 54, 54' form a permanent magnet pair, the permanent magnets 54, 54' of a pair being inclined at an angle to each other relative to the radius of the rotor 44. In another embodiment which is not illustrated, the permanent magnets of a pair can also be arranged parallel to each other. The permanent magnets 54, 54' of a pair have essentially the same direction of magnetization, i.e. the arrangement of the north and south poles as indicated by the arrows in FIG. 4. This means that between the permanent magnets 54, 54' of a pair, no poles are formed but rather the magnetic field lines connect the inner sides of the permanent magnets of a pair at the shortest distance, as can be seen from FIG. 3b The permanent magnets 54, 54' of a pair essentially act as a double magnet enabling the field generated by the magnets to be intensified compared to the embodiment shown in FIG. 2a. The arrangement of the permanent magnets at an angle goes to improve torque and particularly to suppress cogging torque.

The function of the bridges 48, 50 in protecting the embedded permanent magnets 54, 54' and in enabling the rotor 44 to be directly mounted onto a shaft is essentially the same as described in relation to FIG. 2. Moreover, the bridges 50 in combination with shorter radial bridges 56 enclose recesses 58 which bridge adjacent permanent magnets 54, 54' of adjacent permanent magnet pairs. In the illustrated embodiment, the inner bridges 50 connect the spaces between the permanent magnets 54, 54' of a permanent magnet pair. The effect of the recesses 58 thus formed is the same as described in reference to FIGS. 2a and 2b and as explained below in reference to FIG. 3b.

In the embodiment illustrated in FIG. 3a, the flux guide elements 46 are also made of ferromagnetic material and are preferably formed from sheet metal laminations which are stacked to prevent eddy currents. The flux guide elements 46 of the rotor 44 are preferably made as an integral component.

The rotor 44 shown in FIG. 3a is enclosed by a stator 60 with an air gap 62 being formed between the stator 60 and the rotor 44. The stator 60 includes a stator core 64 with associated stator poles onto which phase windings 66, 66' are wound. For its part, the stator core 64 can be made of sheet metal laminations which are stacked as is basically known in the prior art.

Figure 3B:
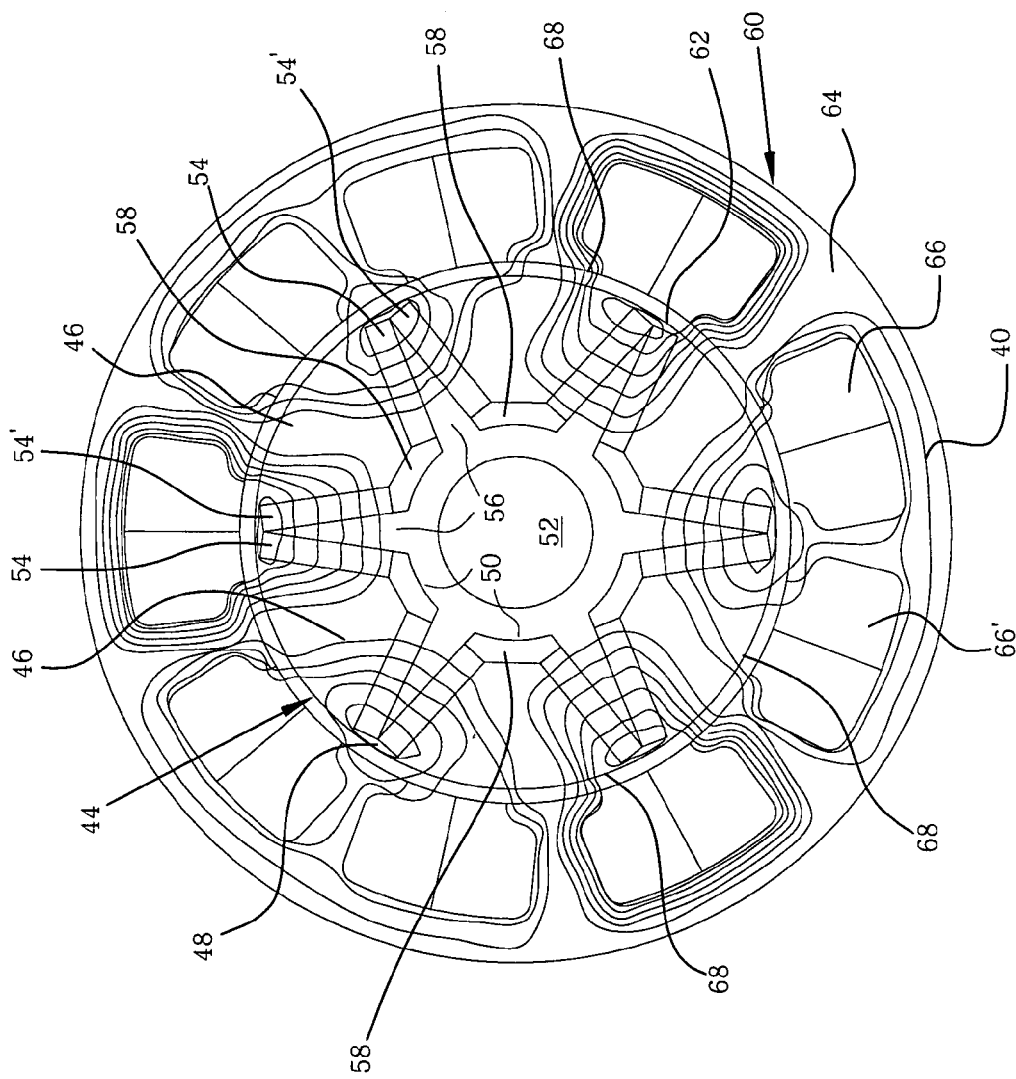

FIG. 3b shows a similar schematic sectional view through the rotor 44 as in FIG. 3a, with like components being indicated by the same reference numbers as in FIG. 3a. In FIG. 3b, flux lines have been marked in to explain the effect of the recesses 58.

Figure 3C:
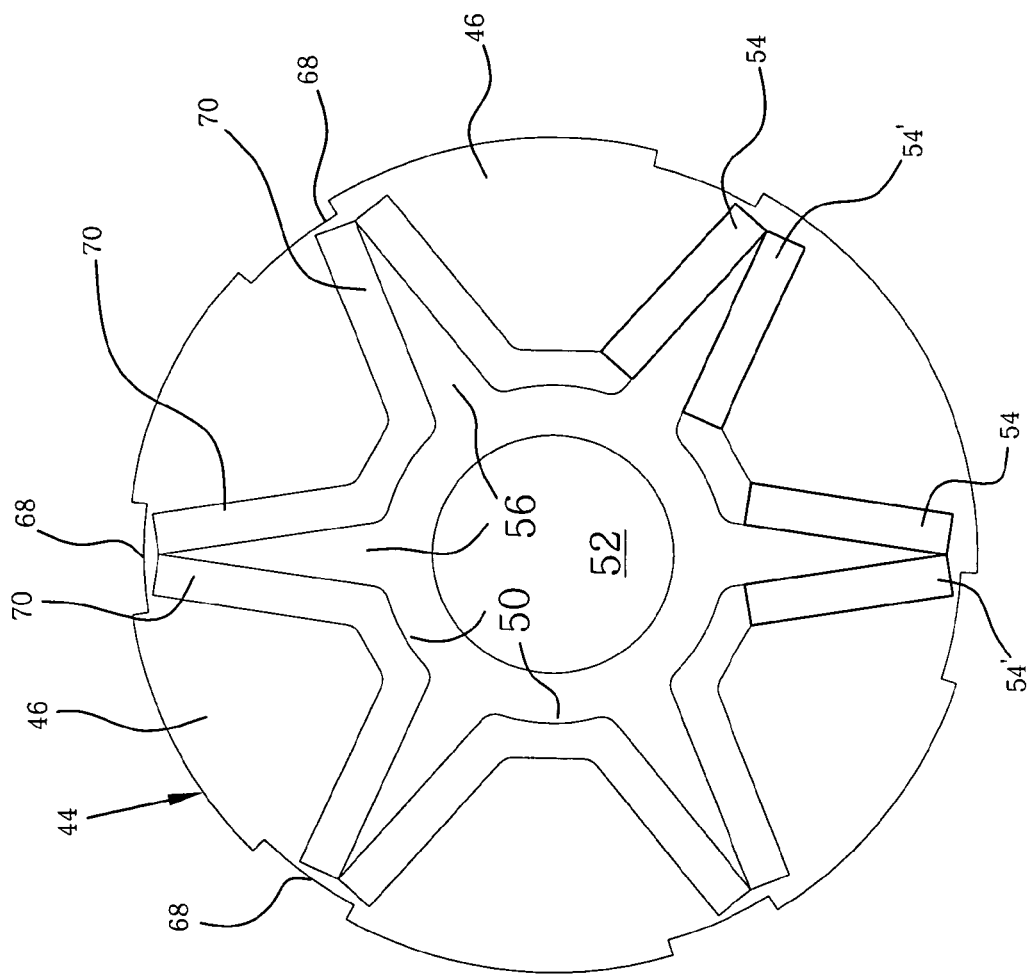

A modification of the embodiment illustrated in FIG. 3a is shown in FIG. 3c, notches 68 being provided in the region of the outer bridges 48 at the outer periphery of the rotor 44 which are distributed evenly or unevenly over the periphery of the rotor 44. These notches 68 improve the torque of the electric motor in operation and, in particular, reduce cogging torque even more than in the embodiments described above.

It can also be seen from FIG. 3c that the rotor can be so constructed that slots 70 to accommodate the permanent magnets 54, 54' can be formed in the rotor 44, the permanent magnets being inserted into these slots 70 and the rotor 44 being then sealed.

Figure 4A:
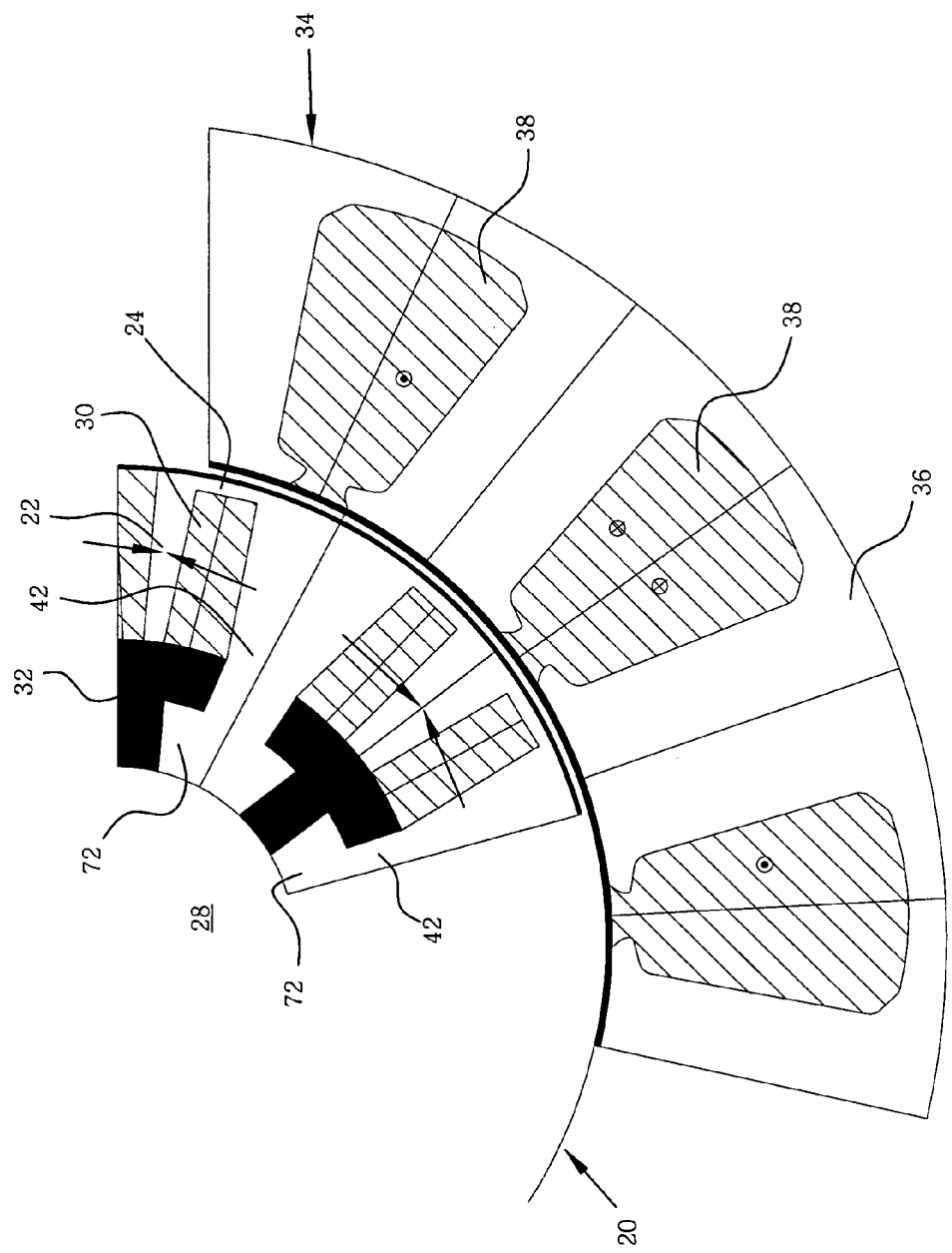
FIG. 4a shows a schematic sectional view through a part of a rotor which represents another starting point for the invention and is described in the unpublished patent application DE 103 18 624.

Another embodiment of the rotor which acts as a starting point for the invention is shown schematically in FIG. 4a. This embodiment substantially corresponds to the embodiment described in reference to FIG. 2a with the radial inner bridges, however, not forming a closed ring. Like components appearing in FIG. 2a are identified by the same reference numbers.

In the embodiment illustrated in FIG. 4a, the recesses 32 are enclosed by the short radial bridges 42 as well as by bridge butts 72, which adjoin the central inner aperture 28 of the rotor 20. The outer bridges 24 ensure an integral rotor body 20 with all the flux guide elements 22 being connected. Although the radial inner bridges or bridge butts 72 are not connected to each other, the recesses 32 provide the same suppression of stray flux between rotor 20 and shaft as described above in reference to the previous embodiments.

Figure 4B:
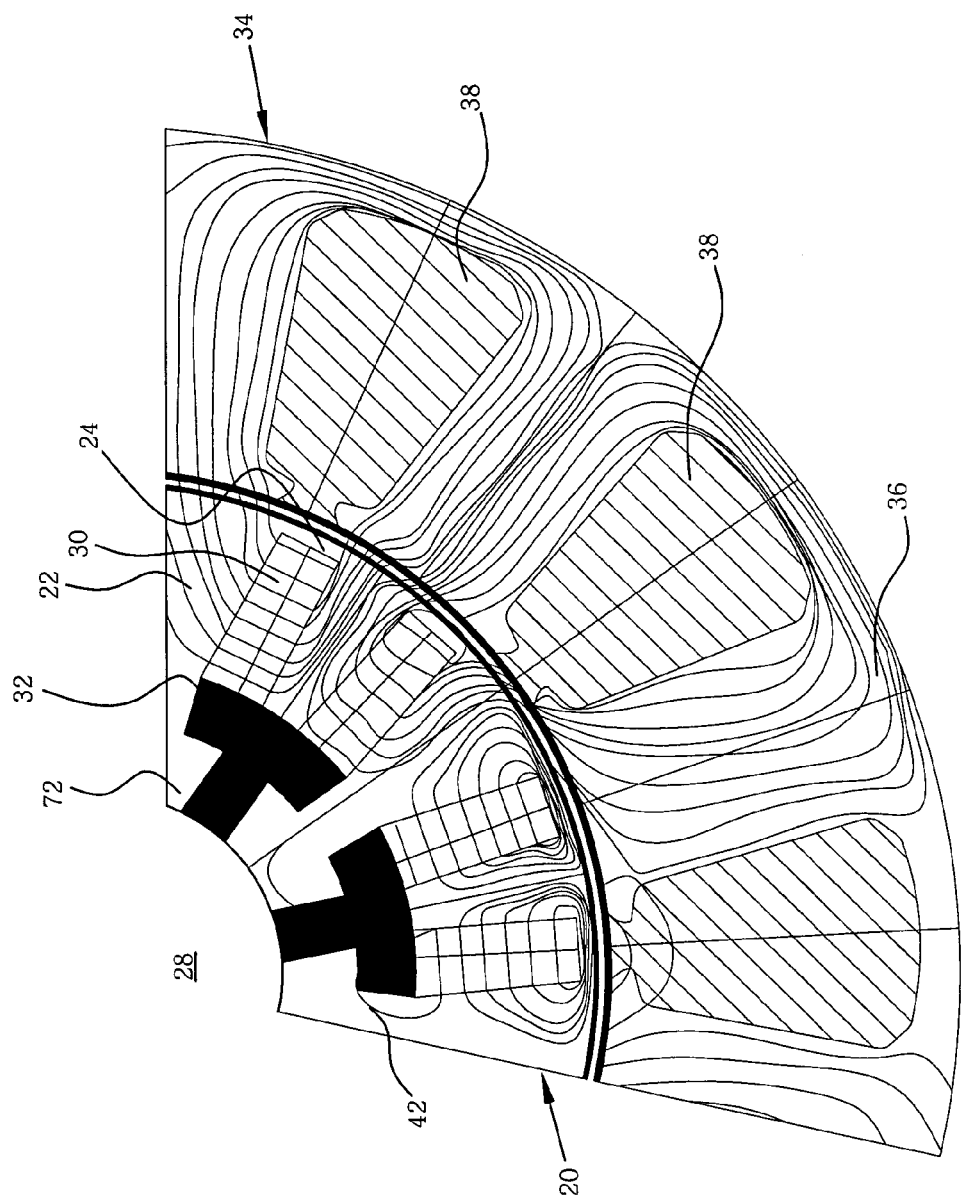
Figure 5A:
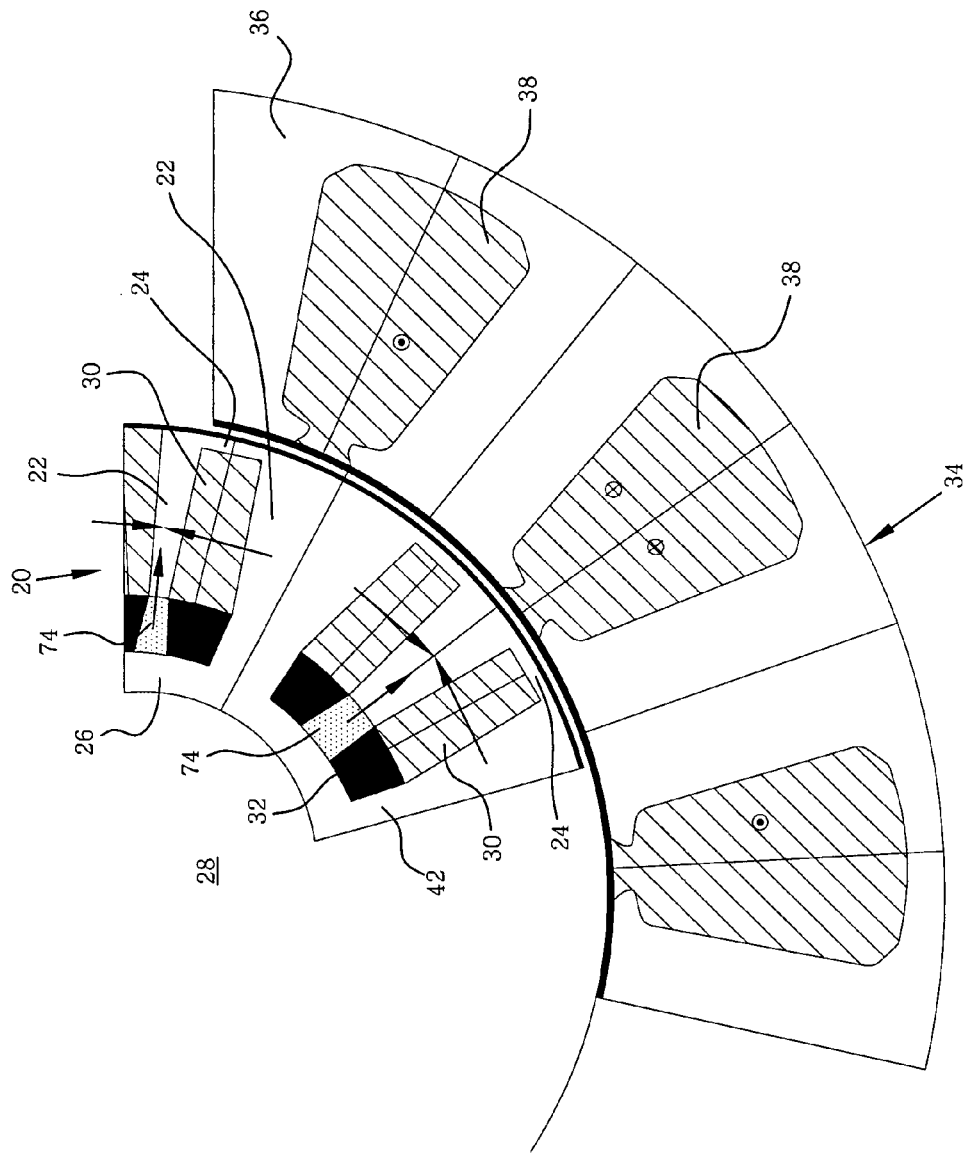
FIG. 5a shows a schematic sectional view through a part of a rotor in accordance with a first embodiment of the invention.

FIG. 4b shows the course of the magnetic flux in this embodiment. FIG. 5a shows a schematic sectional view through a part of a rotor according to the invention, with the embodiment illustrated in FIG. 5a being based on the rotor design shown in FIG. 2a. Like components are indicated by the same reference numbers and are not described in detail again.

In the embodiment illustrated in FIG. 5a, an auxiliary magnet 74 is inserted into the recess 32 which is disposed in the middle between two adjacent permanent magnets 30. The direction of magnetization of the permanent magnets 30 and of the auxiliary magnet 74 is indicated by arrows (N→S). The geometric arrangement of the permanent magnets 30 and their magnetization corresponds with the embodiment illustrated in FIG. 2b. The technician will be aware that the design of the rotor according to the invention can be used in a great variety of rotor configurations having embedded permanent magnets.

Figure 5B:
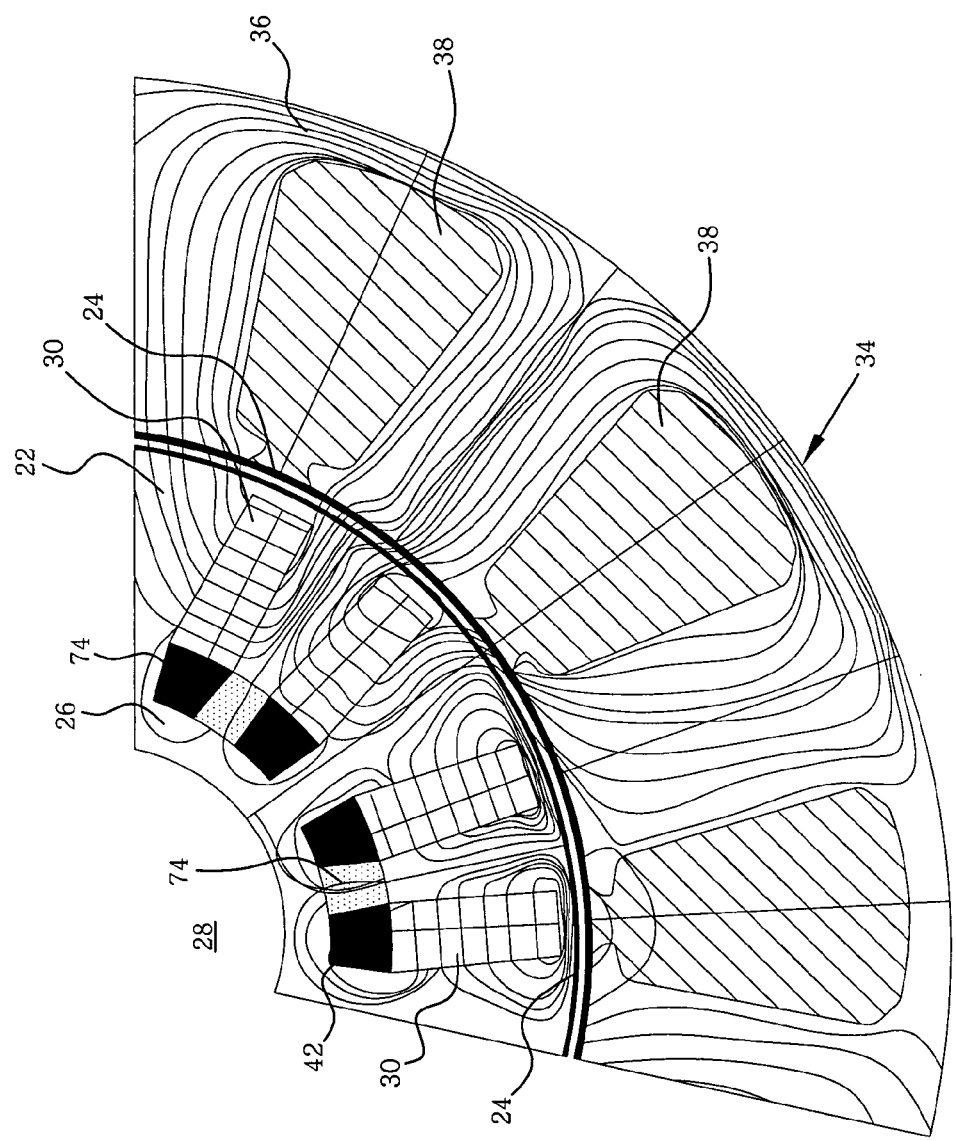

In the embodiment illustrated in FIG. 5a, each auxiliary magnet 74 takes up only a part of the recess 32. The auxiliary magnets 74 have the function of reducing stray flux at the radially inner side of the permanent magnets 30 even further. The effect of the auxiliary magnets 74 is made clear in FIG. 5b, which corresponds to the illustration in FIG. 5a, with the magnetic flux lines generated in operation being marked in. As can be seen in FIG. 5b, the auxiliary magnets 74 concentrate the magnetic field lines in the space between two adjacent permanent magnets 30 and guide them in the desired direction, i.e. outwards towards the stator 34. Since the ferromagnetic flux guide elements 24 of the rotor 20 are generally already saturated on the side of the permanent magnets 30 facing the stator in operation, due to auxiliary magnets 74, the magnetic flux increases in the spaces between the permanent magnets 30, which then in turn goes to increase the magnetic flux between the rotor 20 and the stator 34 and thus the overall effectiveness of the electric motor.

Another advantage of the embodiment illustrated in FIG. 5a is that the rotor 20 has integral flux guide elements and can thus be constructed as a single piece. The auxiliary magnet 74 can be inserted into the recess 32 in the rotor 20 from either side and fixed by bonding, filling in the rest of the recess 32, bracing or by any other means.

Figure 6A:
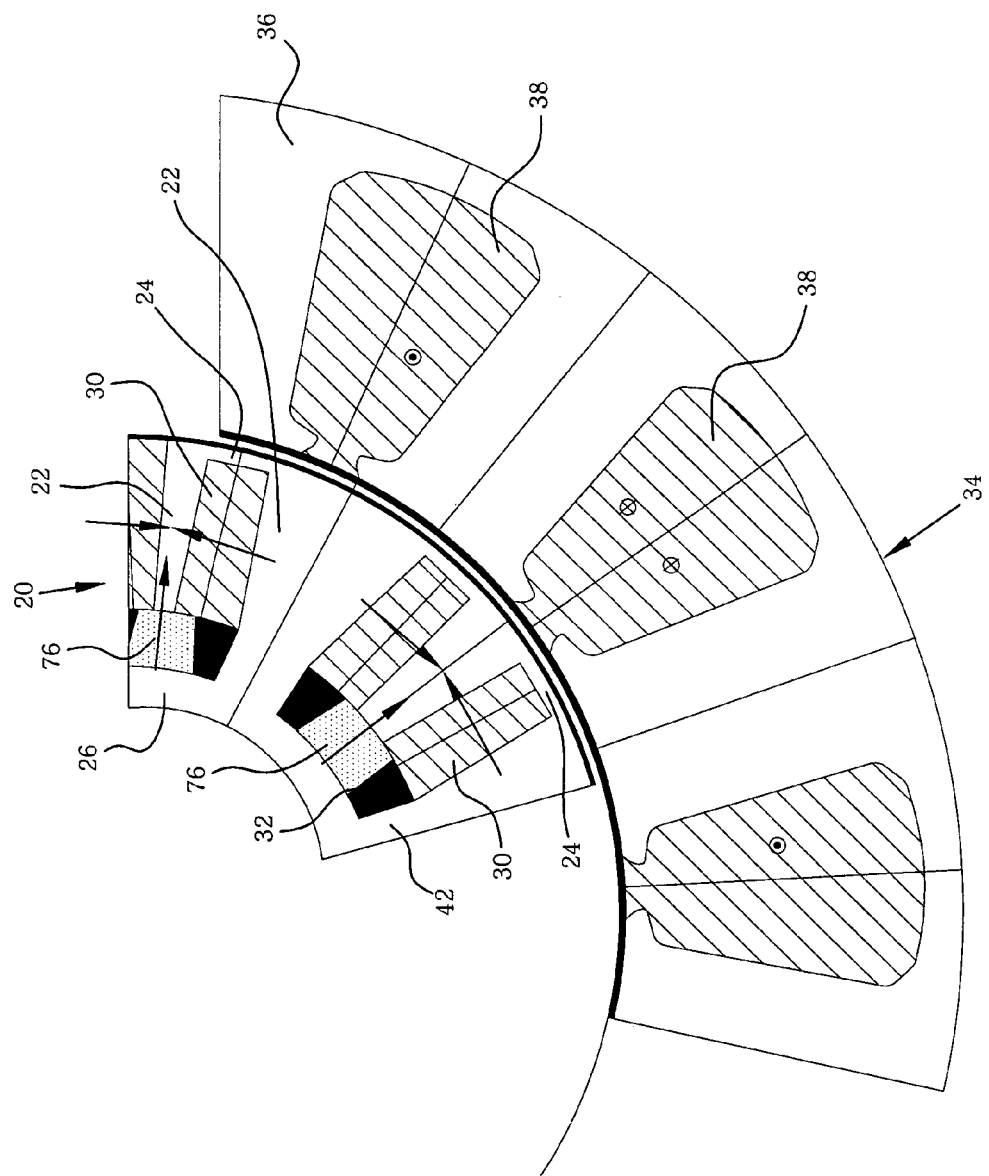
FIG. 6a shows a schematic sectional view through a part of a rotor in accordance with a second embodiment of the invention.
Figure 7A:
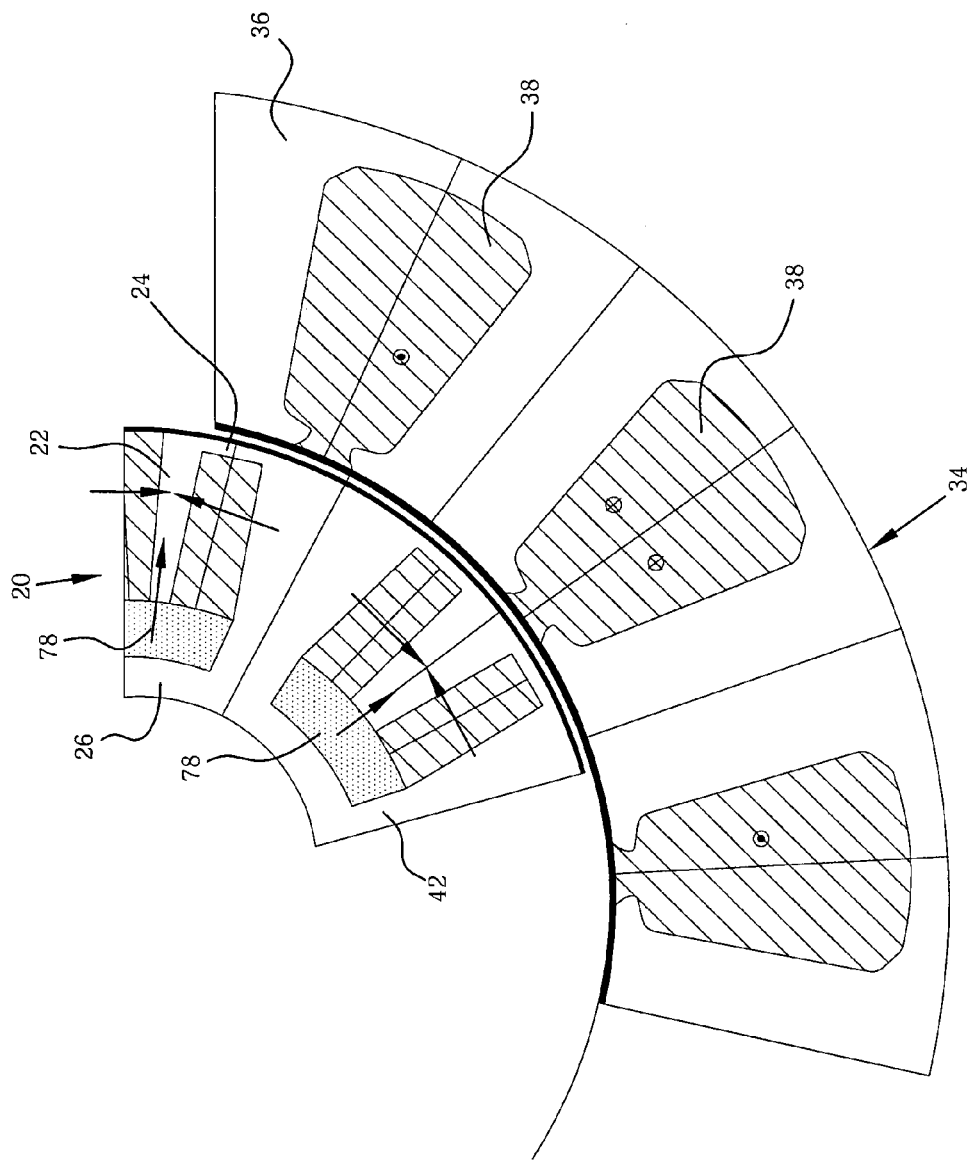
FIG. 7a shows a schematic sectional view through a part of a rotor in accordance with a third embodiment of the invention.

FIGS. 6a and 7a show similar embodiments as in FIG. 5a, with the auxiliary magnets 76 or 78 in FIGS. 6a and 7a taking up an increasingly larger share of the recess 32. In the embodiment illustrated in FIG. 7a the auxiliary magnet 78 fills the recess up completely. The other components of the rotor illustrated in FIGS. 6a and 7a correspond to the illustration in FIG. 5a and are identified by the same reference numbers.

Figure 6B:
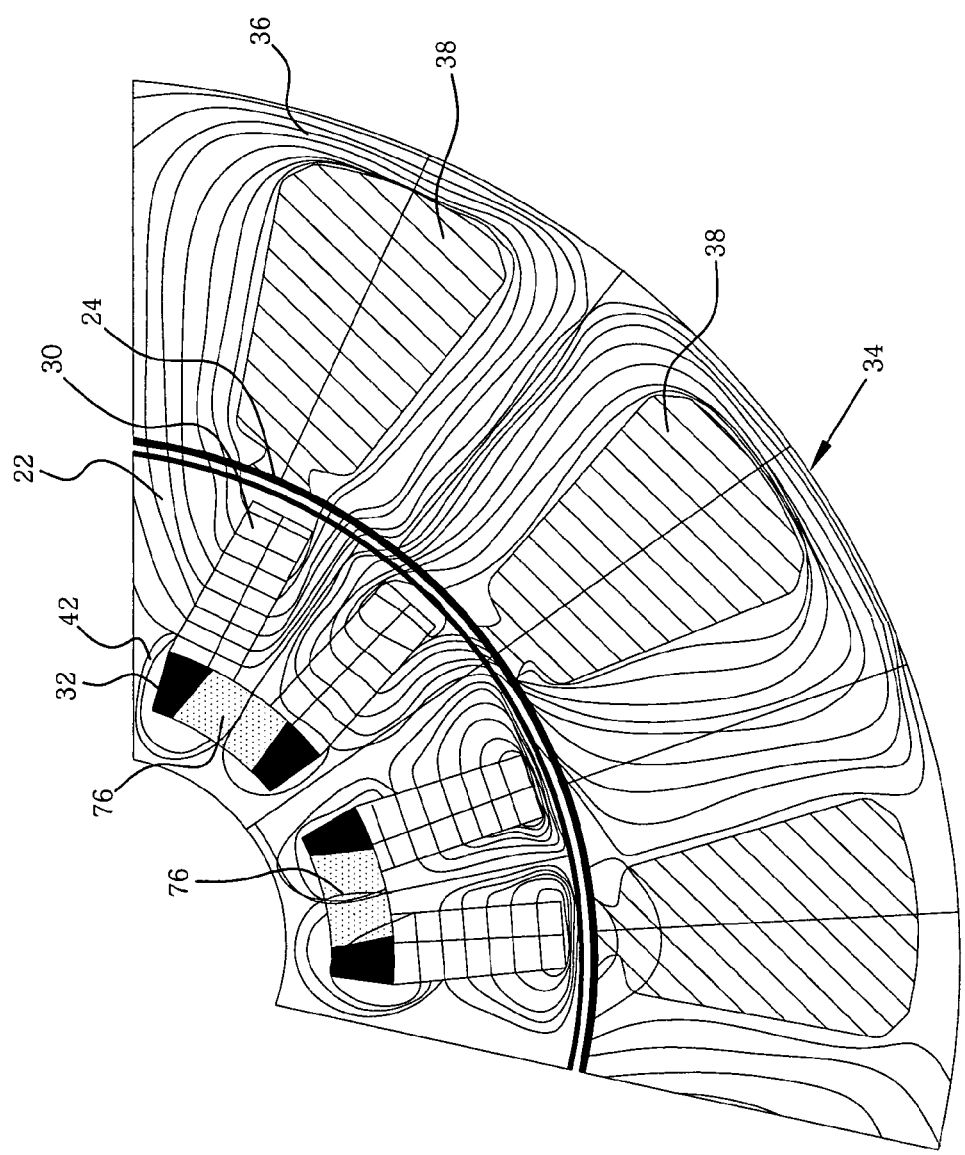
Figure 7B:
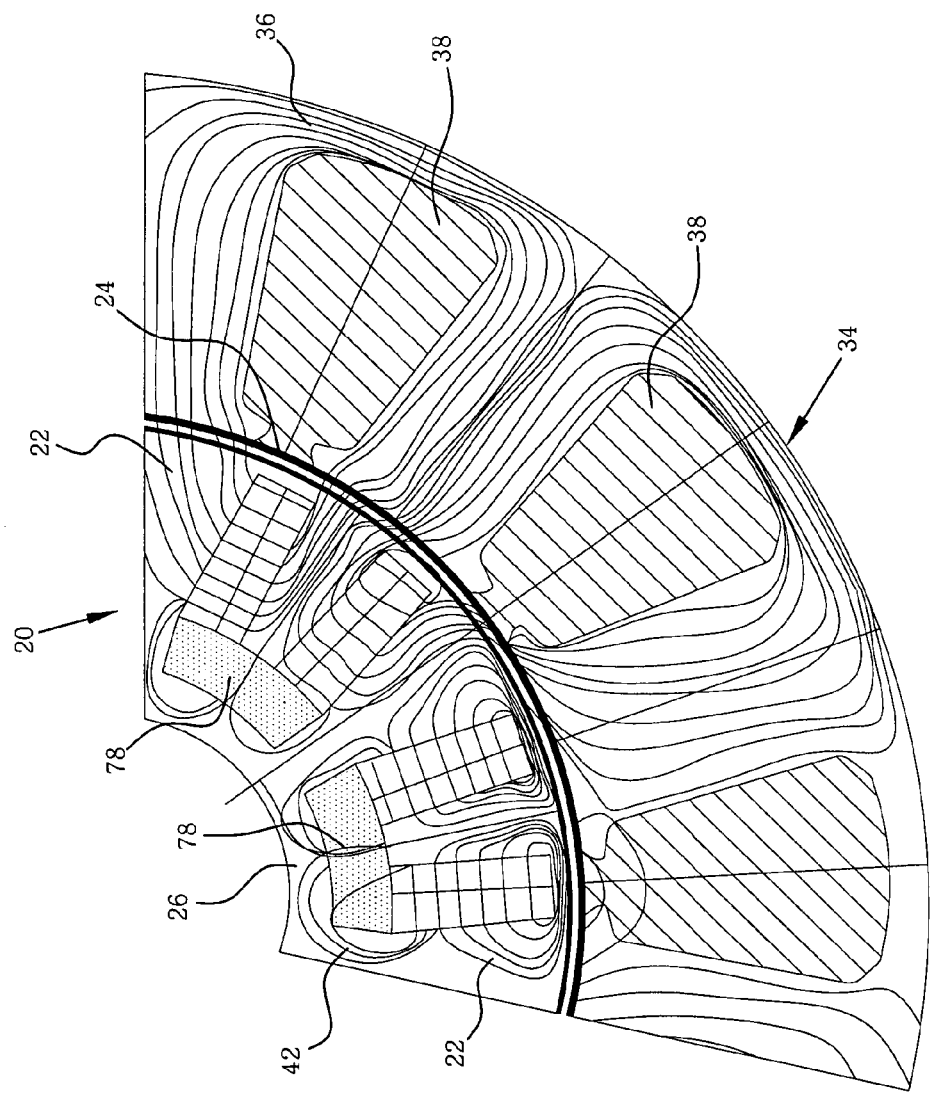

FIGS. 6b and 7b show corresponding illustrations of the rotor according to the invention in which the magnetic flux lines generated during operation of the electric motor are added.

It can be clearly seen from the illustrations in FIG. 5a, 6a and 7a that the design of the auxiliary magnet can feature a large number of modifications. Auxiliary magnets with different designs can also be used in all embodiments of the rotor described in reference to FIG. 2 to 4 as well as in other types of rotors having embedded permanent magnets. The auxiliary magnets can also consist of one or more composite magnets.

Figure 8:
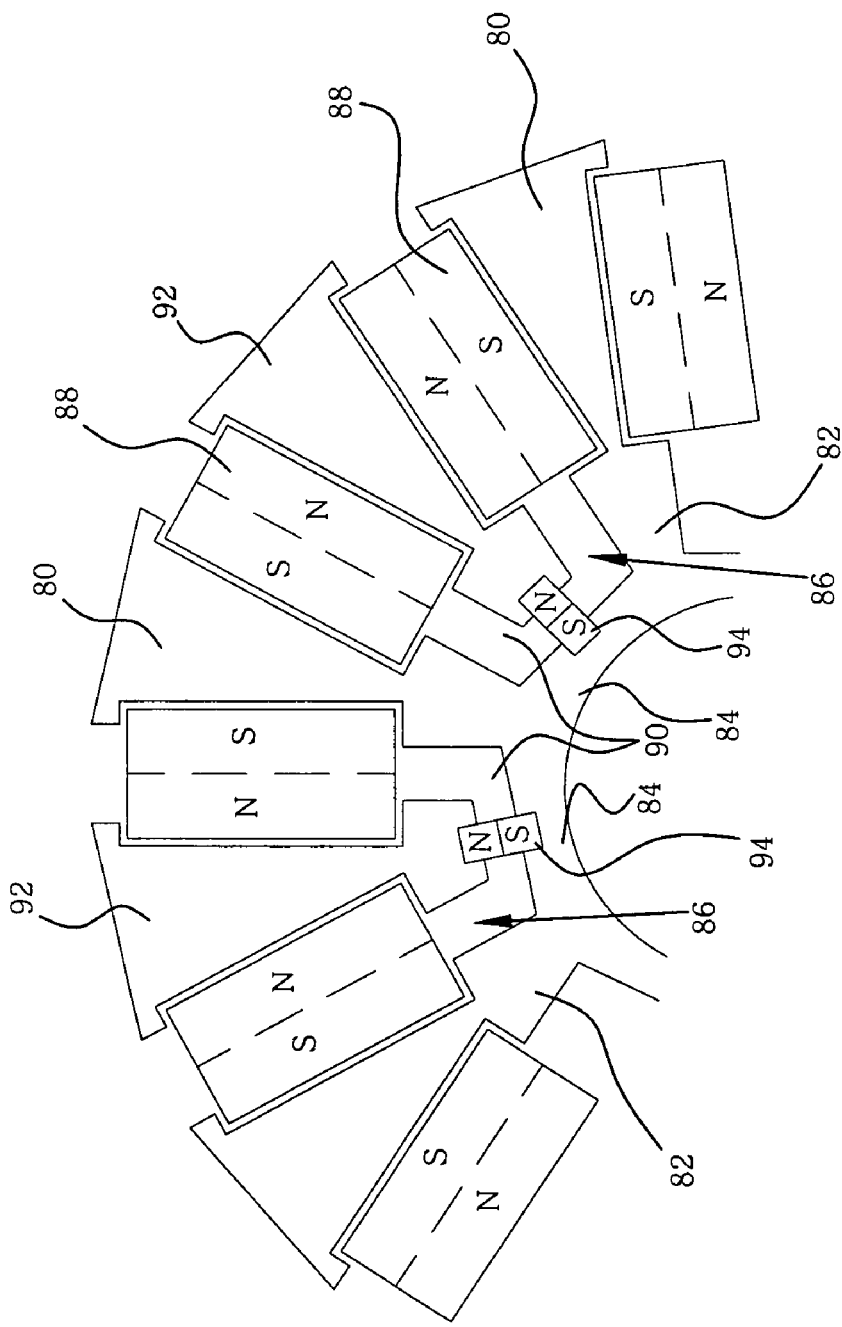
FIG. 8 shows a schematic sectional view through a part of a rotor in accordance with a fourth embodiment of the invention.

FIG. 8 shows another embodiment of the rotor according to the invention in a schematic view of a part of the rotor. The rotor includes flux guide elements 80 which are joined together via radial bridges 82 and inner bridges 84 near a central aperture of the rotor. The inner bridges 84 form a closed ring and thus enclose the central aperture of the rotor. Punched out sections 86 are provided between the flux guide elements 80 which provide space for two adjacent permanent magnets 88 to be accommodated and form a recess 90 between the radially inner ends of these adjacent permanent magnets 88. Other flux guide elements 92 are set in between the adjacent permanent magnets 88 within a punched out section 86, the recess 90 to accommodate the permanent magnets 88 being open radially towards the outside; i.e. the permanent magnets 88 are not fully enclosed by the flux guide elements 80, 92. This means that the flux guide elements of the rotor are no longer integrally connected to each other.

Auxiliary magnets 94 are disposed in the recesses 90 to concentrate and guide the magnetic flux lines. The direction of magnetization of the permanent magnets 88 and the auxiliary magnets 94 is indicated by N and S in FIG. 8.

The construction of the rotor shown in FIG. 8 is advantageous in that the magnetic flux can be more intensively concentrated which means that the magnetic flux from rotor to stator increases further which goes to increase the effectiveness and the maximum performance of the electric motor even further.

To protect the permanent magnets 88 against the effect of centrifugal forces in a radial direction, the individual flux guide elements 80, 92 have shoulders on their outer periphery to hold the permanent magnets 88. In the embodiment illustrated in FIG. 8, it is expedient to injection mold or encapsulate the entire rotor with plastics. Injection molding or encapsulating the rotor can of course also be provided for all the other embodiments.

Figure 9A:
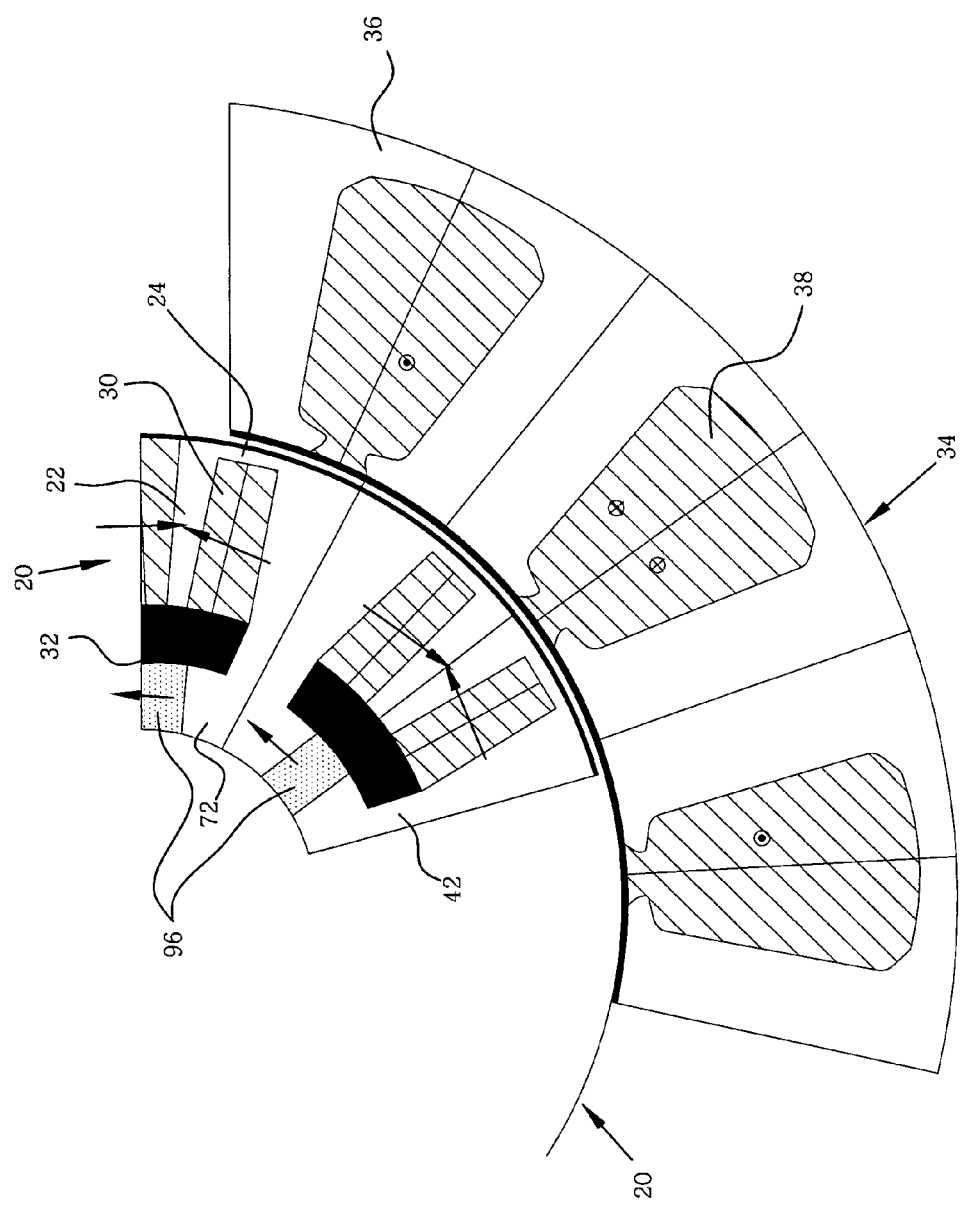
FIG. 9a shows a schematic sectional view through a part of a rotor in accordance with a fifth embodiment of the invention.
Figure 9B:
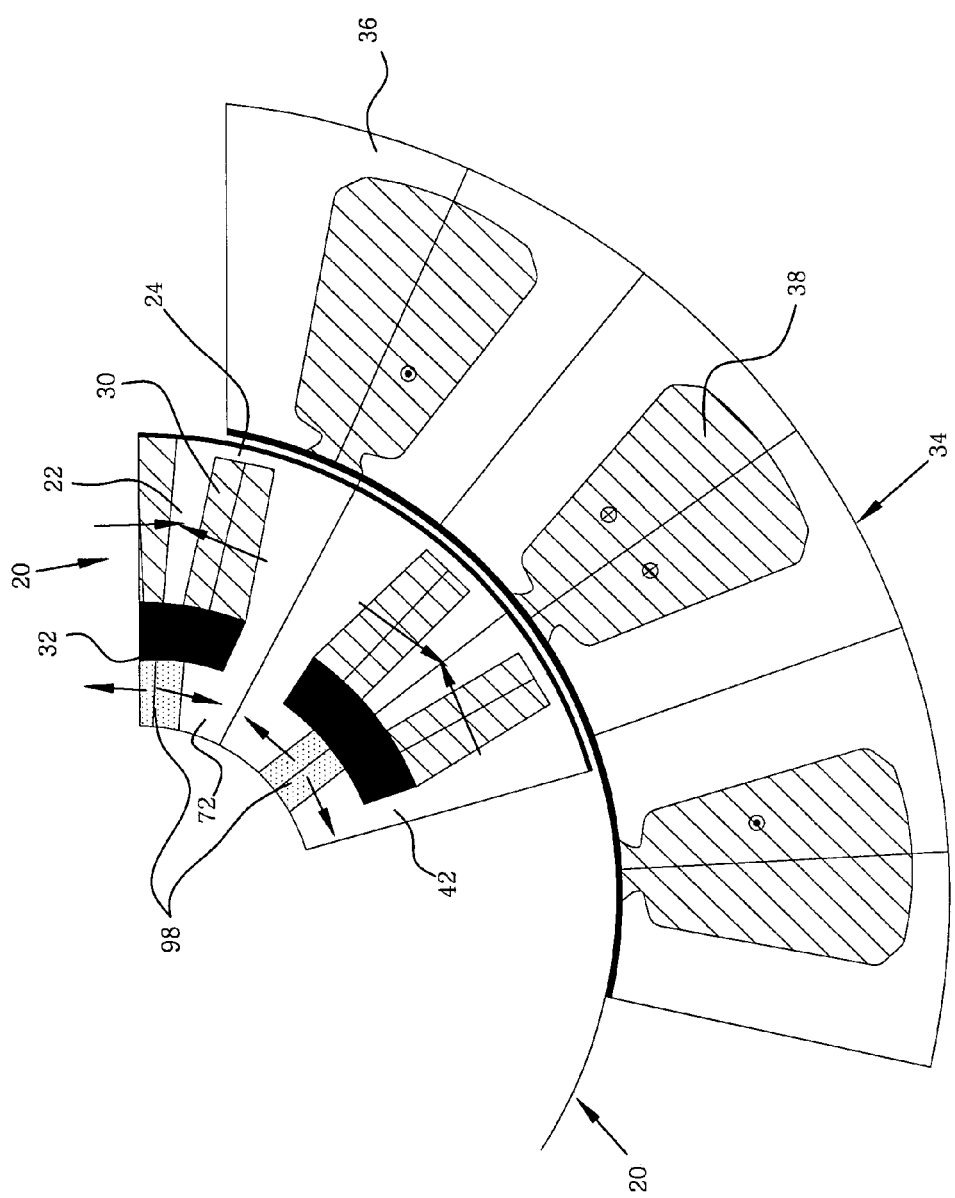
FIG. 9b shows a schematic sectional view through a part of a rotor in accordance with a modification of the fifth embodiment of the invention.
Figure 9C:
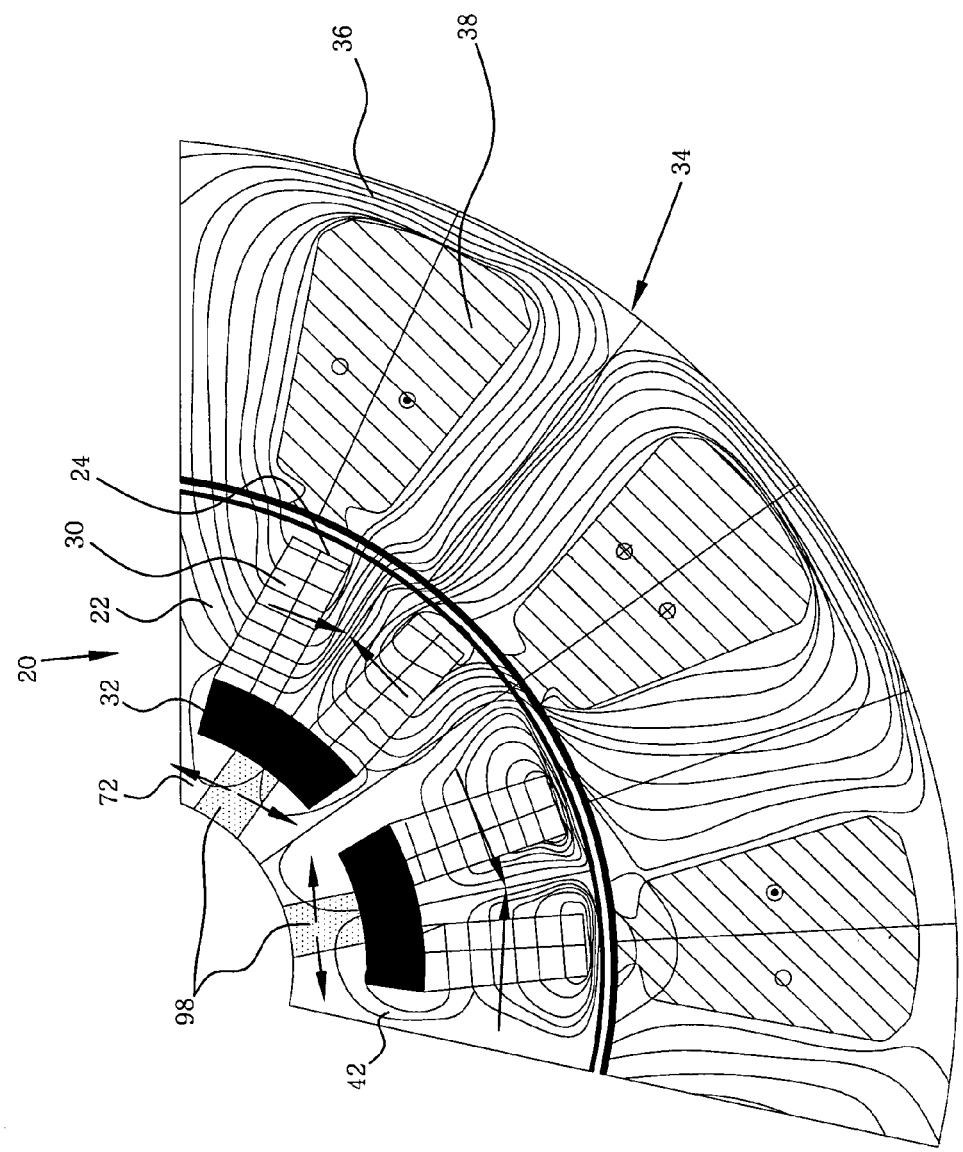

FIGS. 9a and 9b show other embodiments of the rotor according to the invention which are substantially based on the variation of the rotor illustrated in FIG. 4a. In the embodiments shown in FIGS. 9a and 9b, the auxiliary magnets 96, 98 are not integrated in the rotor within the recess 32 but rather in the region of the inner bridges 72. The other components of the embodiments illustrated in FIGS. 9a and 9b are described with reference to FIG. 4a and are identified by the same reference numbers. Reference is made to the above description. The auxiliary magnets 96, 98 disposed in the region of the inner bridges 72 can be magnetized in the same or the opposite direction as indicated by the arrows in FIGS. 9a and 9b. Moreover, they can consist of one or more composite individual magnets. The course of the magnetic flux lines for the embodiment shown in FIG. 9b is illustrated in FIG. 9c.

Figure 10A:
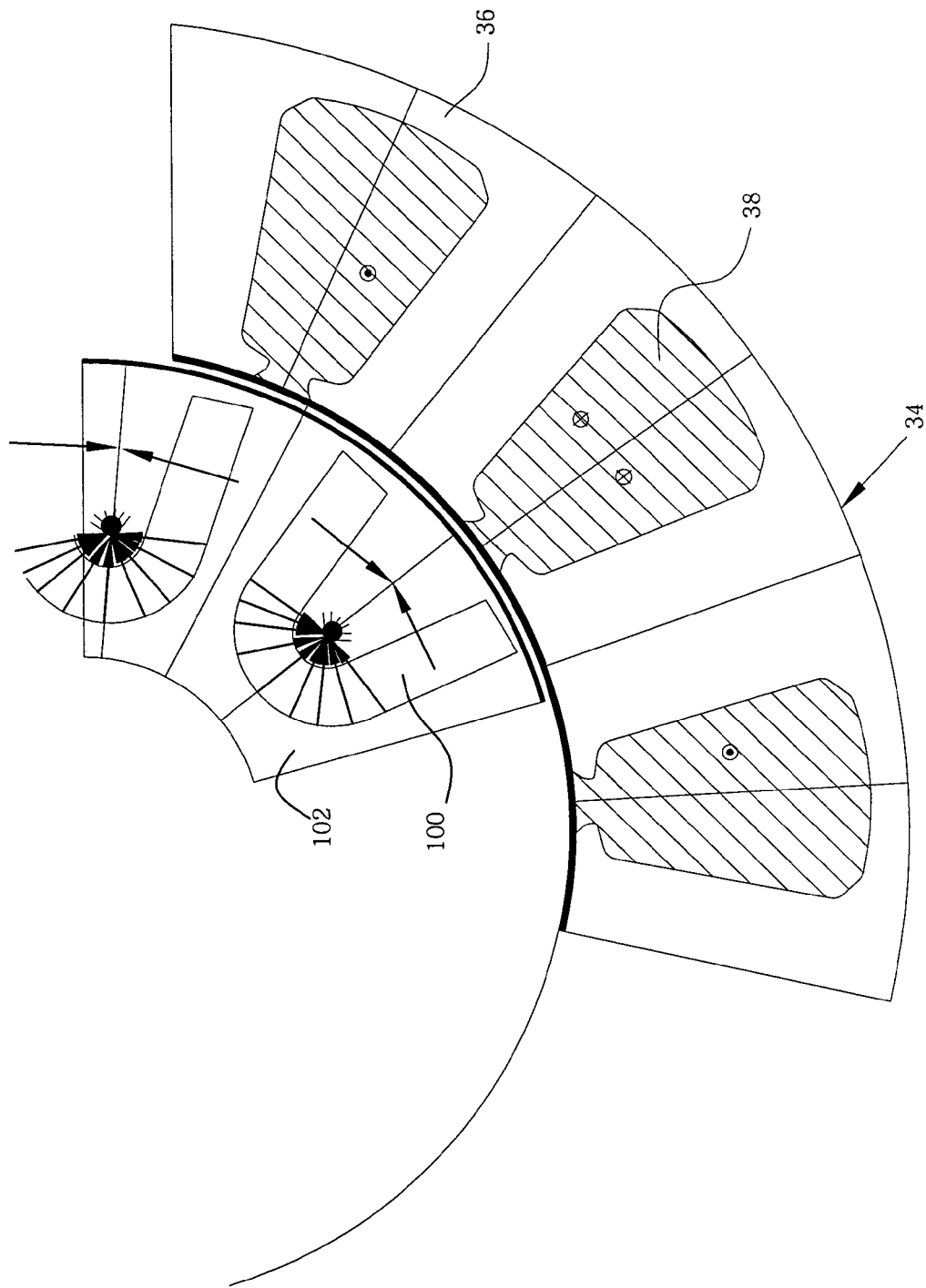
FIG. 10a shows a schematic sectional view through a part of a rotor in accordance with a sixth embodiment of the invention.

Another embodiment of the rotor according to the invention is again shown schematically in FIG. 10a. In this embodiment, two adjacent permanent magnets and their associated auxiliary magnet are replaced by one single U-shaped, V-shaped or similarly shaped magnet. In other words, the auxiliary magnet is formed integrally with two respective adjacent permanent magnets 100. The rotor 102 preferably has suitable U-shaped or V-shaped punched out section into which the magnet 100 can be inserted. The direction of magnetization of the two legs as well as the apex region of the magnet are indicated by arrows in FIG. 10a.

Figure 10B:
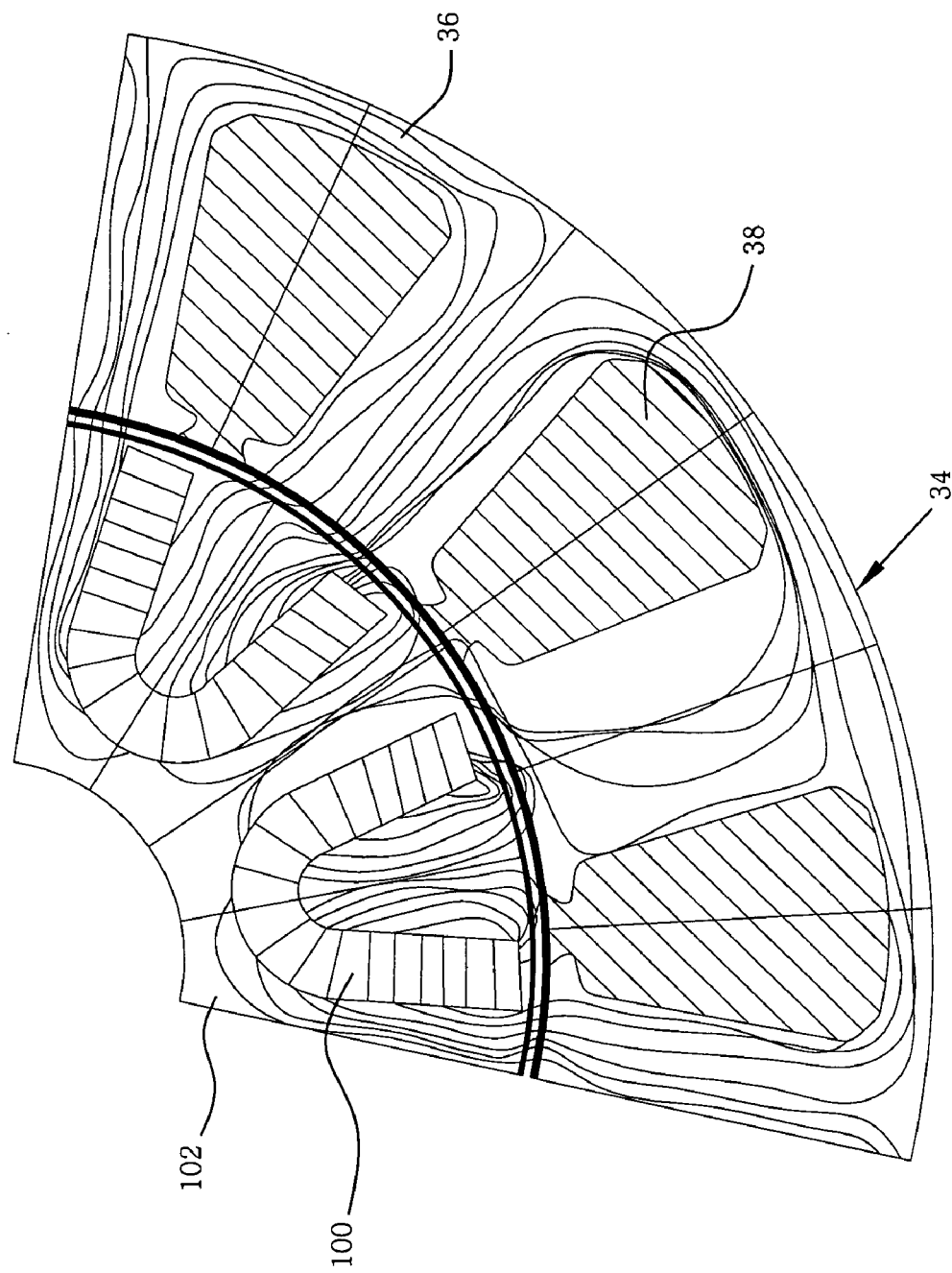
Figure 11:
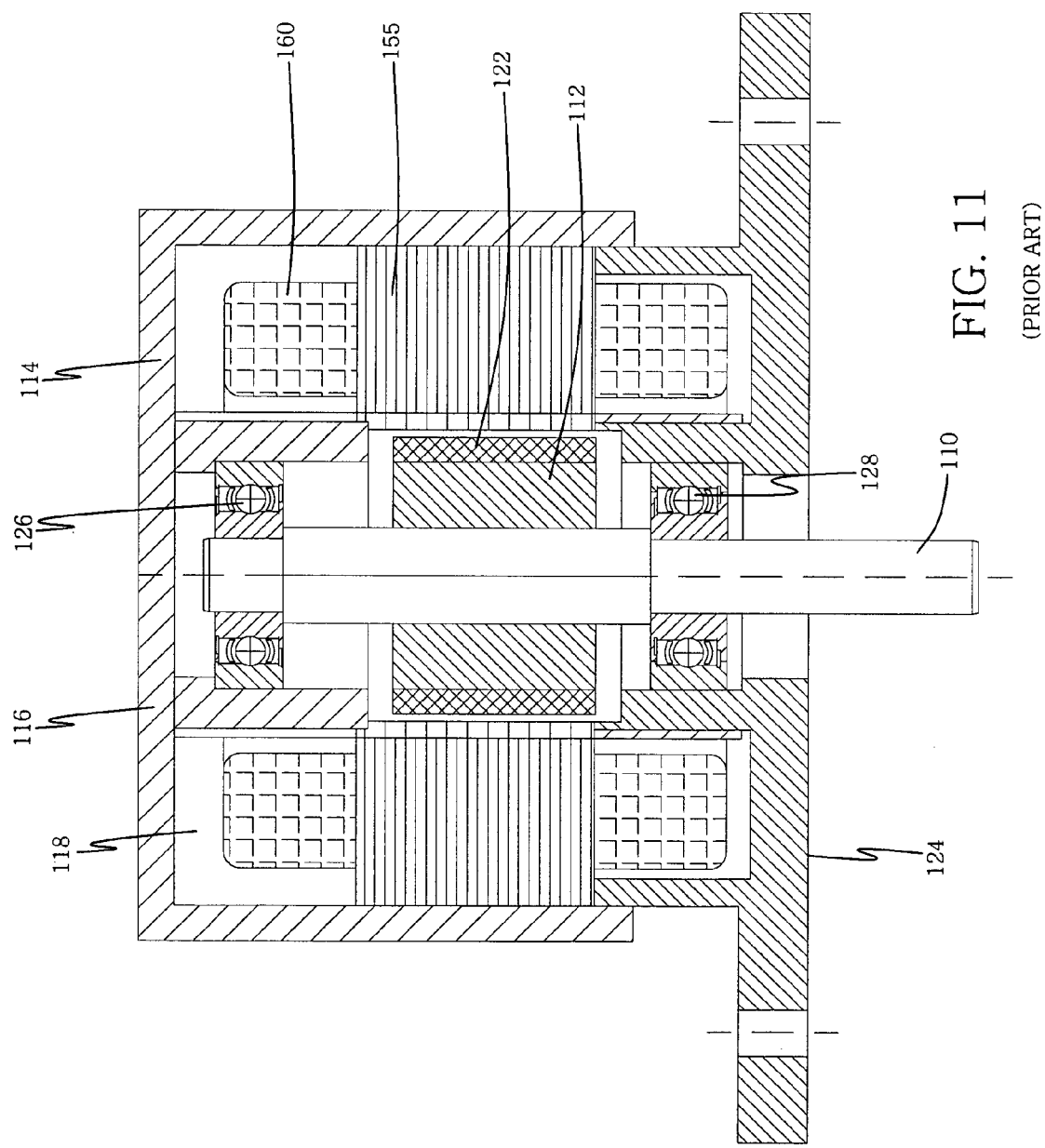
FIG. 11 shows a sectional view through an electric motor according to the prior art.

FIG. 10b shows the course of the magnetic flux lines of the embodiment illustrated in FIG. 10a in operation. It can be seen that no magnetic stray flux occurs in the region of the inner ring of the rotor.

As can be derived from the above description, a large number of modifications of the rotor presented in the invention are possible. The various aspects of the individual embodiments in respect of the disposition, formation and magnetization of the permanent magnets, in respect of the disposition, formation and magnetization of the auxiliary magnets, in respect of the design of the recesses or in respect of other parameters described above can be arbitrarily combined as required.

A motor with half the number of poles in relation to the motor described above can be created in that two respective adjacent permanent magnets following one another have the same direction of magnetization or in that every second permanent magnet is omitted and the space accommodating these permanent magnets is left empty.

The characteristics revealed in the above description, the claims and the figures can be important for the realization of the invention in its various embodiments both individually and in any combination whatsoever.

Identification Reference List

10 Rotor
12 Shaft
14 Sleeve
16 Flux guide elements
18 Permanent magnets
20 Rotor
22 Flux guide elements, rotor core.
24,26 Bridges
28 Central aperture
30 Permanent magnets
32 Recess
34 Stator
36 Stator core
38 Stator windings
40 Flux lines
42 Radial bridges
44 Rotor
46 Flux guide elements, rotor core
48, 50 Bridges
52 Central aperture
54, 54' Permanent magnets
56 Radial bridges
58 Recesses
60 Stator
62 Air gap
64 Stator core
66, 66' Phase windings
68 Notches
70 Slots
72 Bridge butts
74 Auxiliary magnet
76 Auxiliary magnet
78 Auxiliary magnet
80 Flux guide elements
82 Radial bridges
84 Inner bridges
86 Punched out sections
88 Permanent magnets
90 Recess
92 Flux guide elements
94 Auxiliary magnets
96, 98 Auxiliary magnets
100 U-shaped magnet
102 Rotor
110 Shaft
112 Back iron yoke
114 Housing
116 Rotor arrangement
118 Stator arrangement
122 Permanent magnets
124 Flange
126, 128 Bearings
155 Metal laminations
160 Windings

The invention claimed is:

1. A rotor for an electric motor comprising: a rotor core having a central aperture and a plurality of permanent magnets embedded in the rotor core, the permanent magnets extending radially about the central aperture and having an inner end and an outer end, wherein adjacent permanent magnets are grouped in pairs wherein each of the adjacent magnet in a pair is magnetized in opposite directions, and wherein the adjacent permanent magnets in a pair are adjoined by a recess at the inner ends of the permanent magnets; one or more auxiliary magnets located adjacent the central aperture and radially inward of the inner recess.

2. The rotor of claim 1 wherein one auxiliary magnet is located adjacent the central aperture radially inward of the inner recess and the direction of magnetism of the auxiliary magnet is the same direction as one of the adjacent permanent magnets.

3. The rotor of claim 1 wherein two auxiliary magnets are located adjacent the central aperture radially inward of the inner recess and the auxiliary magnets are magnetized in opposite directions from the other.

* * * * *